US009265242B2

(12) United States Patent
Ramos

(10) Patent No.: US 9,265,242 B2
(45) Date of Patent: Feb. 23, 2016

(54) SYSTEM TO APPLY MAINLY PHYTOSANITARY PRODUCTS THAT USE THE PRINCIPLE OF ELECTROSTATIC ATTRACTION

(75) Inventor: Carlos Alberto Moreno Ramos, Rancagua (CL)

(73) Assignee: Adolfo Alamos Vasquez (CN)

( * ) Notice: Subject to any disclaimer, the term of this patent is extended or adjusted under 35 U.S.C. 154(b) by 1003 days.

(21) Appl. No.: 12/970,402

(22) Filed: Dec. 16, 2010

(65) Prior Publication Data

US 2012/0085843 A1 Apr. 12, 2012

(30) Foreign Application Priority Data

Oct. 7, 2010 (CL) .................................. 1104-2010

(51) Int. Cl.

| | |
|---|---|
| ***B05B 5/00*** | (2006.01) |
| ***A01M 7/00*** | (2006.01) |
| ***B05B 1/20*** | (2006.01) |
| ***B05B 5/035*** | (2006.01) |
| ***B05B 5/053*** | (2006.01) |
| ***B05B 5/08*** | (2006.01) |
| ***B05B 15/06*** | (2006.01) |

(52) U.S. Cl.
CPC ............. *A01M 7/006* (2013.01); *A01M 7/0071* (2013.01); *B05B 1/202* (2013.01); *B05B 5/035* (2013.01); *B05B 5/0533* (2013.01); *B05B 5/085* (2013.01); *B05B 15/066* (2013.01)

(58) Field of Classification Search
CPC ........ B05B 5/03; B05B 5/035; B05B 5/0533; B05B 1/202; B05B 15/066; B05B 5/085; A01M 7/006; A01M 7/0071
USPC .................. 239/169–170, 549–557, 690–708
See application file for complete search history.

(56) References Cited

U.S. PATENT DOCUMENTS

| | | | | |
|---|---|---|---|---|
| 2,453,595 | A * | 11/1948 | Rosenthal .............. | F02M 27/08 123/198 E |
| 4,343,979 | A * | 8/1982 | Barbini et al. ................ | 219/700 |
| 4,398,672 | A | 8/1983 | Arnold et al. | |
| 4,470,550 | A | 9/1984 | Coffee | |
| 4,579,279 | A | 4/1986 | Marchant | |
| 4,586,657 | A | 5/1986 | Johnson et al. | |
| 4,613,075 | A | 9/1986 | Owen | |
| 4,664,315 | A | 5/1987 | Parmentar et al. | |
| 4,779,805 | A * | 10/1988 | Jackson et al. ................ | 239/704 |
| 5,172,861 | A | 12/1992 | Lenhardt | |
| 5,314,123 | A * | 5/1994 | Miller .................. | A01K 13/001 239/120 |
| 5,485,956 | A | 1/1996 | Lenhardt | |

(Continued)

OTHER PUBLICATIONS

Chilean Patent Application (Request) No. 00055-2004 filed Jan. 14, 2004, Published Dec. 24, 2004 (English Explanation included).

*Primary Examiner* — Justin Jonaitis
*Assistant Examiner* — Joel Zhou
(74) *Attorney, Agent, or Firm* — Fay Sharpe LLP

(57) ABSTRACT

A system to apply mainly phytosanitary products that use the principle of electrostatic attraction. A high static charge is imprinted on the microdrops in the nozzle with high flows of water using a simple industrial design and very low probabilities of failure. The system is very stable and reliable. An active water provider capillary tube is optionally used in the nozzles (as opposed to a fixed one), which results in a more efficient use of the air to micronize drops. The nozzles can be fixed or dirigible nozzles. A chemical product doser system is optionally used with injection in the nozzle itself.

18 Claims, 25 Drawing Sheets

(56) References Cited

U.S. PATENT DOCUMENTS

| | | | | |
|---|---|---|---|---|
| 5,631,802 | A | 5/1997 | Trusty | |
| 6,003,794 | A * | 12/1999 | Hartman et al. | B05B 5/03 239/695 |
| 6,138,922 | A | 10/2000 | Hartman et al. | |
| 6,227,466 | B1 * | 5/2001 | Hartman et al. | 239/704 |
| 6,311,903 | B1 | 11/2001 | Gaw et al. | |
| 6,354,522 | B2 | 3/2002 | Iwata et al. | |
| 6,682,004 | B2 | 1/2004 | Kadlubowski et al. | |
| 7,059,543 | B2 | 6/2006 | Dushkin et al. | |
| 7,150,412 | B2 | 12/2006 | Wang et al. | |
| 7,208,727 | B2 * | 4/2007 | Fedorov et al. | 250/287 |
| 7,360,724 | B2 * | 4/2008 | Willey et al. | B05B 1/044 239/556 |
| 2004/0177807 | A1 * | 9/2004 | Pui et al. | 118/303 |
| 2004/0241315 | A1 * | 12/2004 | Pui et al. | 427/2.24 |
| 2006/0124779 | A1 * | 6/2006 | Cooper | B05B 3/12 239/690 |

* cited by examiner

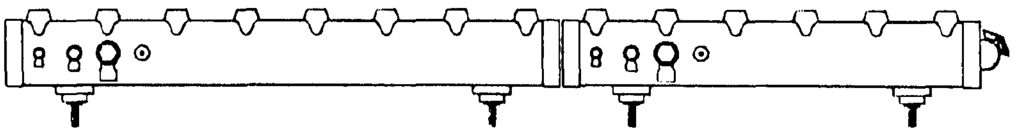
Fig. 1b
Fig. 1c
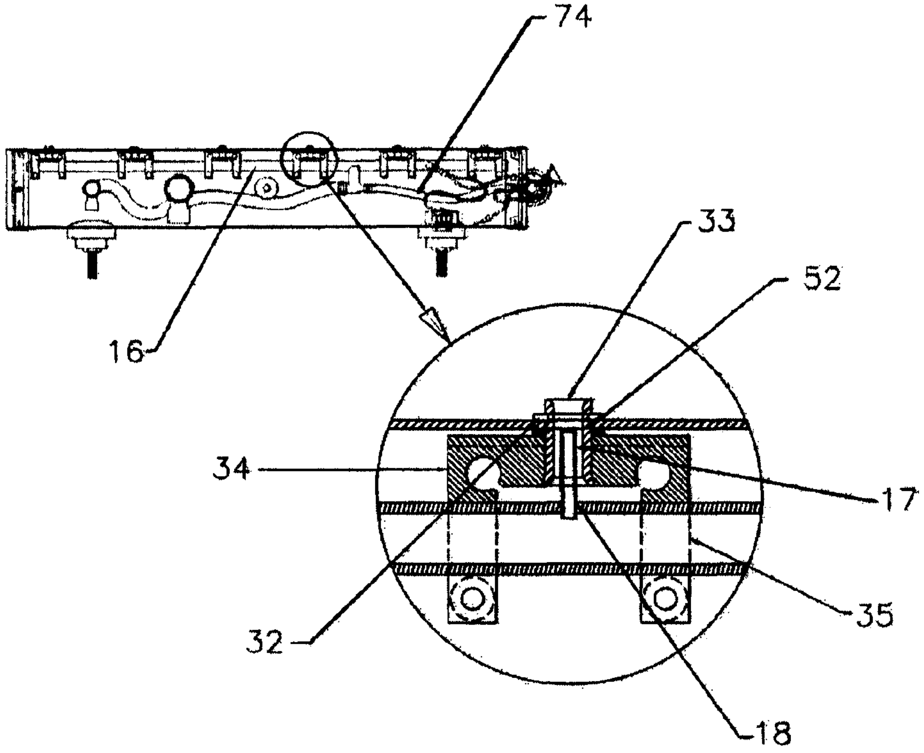

SYSTEM TO APPLY MAINLY PHYTOSANITARY PRODUCTS THAT USE THE PRINCIPLE OF ELECTROSTATIC ATTRACTION

BACKGROUND

Since long time ago, agricultural producers have looked for technical options to improve the application of phytosanitary products. The main difficulty has been to achieve efficiency, in order for the applied product to reach its target and fully cover it. The achievement of such efficiency directly affects the quality of fruits or crops as well as the production costs and, therefore, the expected profitability of such production.

The electrostatic concept consists of the application of an aqueous solution, which drop is micronized and turned into soft mist. This microdrop is driven by a very efficient carrier that is the air, which micronizes the drop that receives a strong positive electric charge upon getting out from the nozzle, fact that generates the polarity change of the solution since, due to the repulsion of charges, positive charges of the solution are repelled back, allowing only microdrops with negative charge to pass. At the same time, the cloud with negative drops creates a temporary unbalance of charges on the target of the application because its negative charges are repulsed and go to earth, leaving the target with momentary positive charge. In this way and due to the attraction of charges the negative microdrops are strongly attracted by the target, which is fully embraced and covered with this mist. This application technology manages to make the plant attract the products in the same manner as a magnet attracts pieces of metals. The microdrops are stuck to the target attracted by charge differences, thus reducing the losses due to leakage and deviation caused by the wind, which, in turn, results in an extraordinary cover and in a superior effect of the applied products. This permits a significant reduction in the quantity of chemical products to be applied per hectare due to the efficiency achieved and, therefore, it implies a strong reduction of the negative impact on the environment resulting from the use of pesticides. To sum up, the producer grows better and stronger fruit with better color, at lower costs and generating minimum damages to the environment.

In the case of the application with electrostatic effects, there is a drop micronization to sizes that are 800 to 1000 times smaller than the average of drops in a traditional application. The fact that each drop has the same static charge implies that the drops travel towards the target without getting together (equal charges repel each other) looking for a place to settle in an extremely uniform way. Only after attaching to the positive charge plant's surface, they lose their charge and get stuck to the plant without leaking. The electrostatic application coats the surface through a thin layer of microdrops well distributed on both sides of the leaves as opposed to conventional applications with variable drop size which get uneven coating of the plant, and surfaces that not face the application do not receive the product.

This technology has been used to carry out different activities for several decades. It has been widely used in painting, especially in the automotive industry where an extremely uniform layer is applied to print a distinctive touch on their valuable products. A few decades ago, the agricultural industry adopted this technology for spraying, which meant a great contribution. With these devices an excellent "enveloping effect" is obtained, which means that the sprayed product wraps and covers 100% of the plant. Each application of agrochemical product will cover the whole surface of the leaves, branches and fruits.

The electrostatic technology used in the agricultural industry revolutionizes the concepts of phytosanitary handling of orchards and crops, obtaining efficiencies in covering the foliage and in the deposit of products (meaning by deposit the amount of product left on the plant), that can only be reached through the use of this technology, which may increase up to five times the efficiency reached with conventional applications.

However, in spite of its important advantages, the electrostatic technology had been efficiently used only on a small portion of worldwide crops, because the volumes of water that had managed to use are significantly lower than the volumes required by most of them.

The low volume of water used by pre-existing electrostatic technology results from the fact that the technology used was adapted from technology used in other industries and not obtained due to the development of new technologies specifically made for the agricultural industry.

We can point out that currently the existing electrostatic technology has the following defects that are really important: it delivers a low electrostatic charge; therefore, low flows must be used in each nozzle. This means that in order to acceptably wet the surface it must be applied at slow speed. Lower charge means also lower electrostatic attraction. The issues mentioned above make the capacity of these devices to be insufficient to supply what is required by a great number of crops.

What was mentioned above results from the fact that up to this date there was no technology that could adequately charge high volumes of water. Such defect can be cured by the technology described herein.

This technology may be used in any kind of crops. From fruit orchards to important crops such as wheat, maize, field marigold and other crops that currently have not been handled efficiently with the new technologies.

There are many patents related to the use of the electrostatic technology for agricultural purposes but none of them refers to any invent with the characteristics and purposes of the equipment subject matter of this innovation. Some of such patents are the following:

U.S. Pat. No. 4,470,550—Electrostatic spraying process and apparatus—Sep. 11, 1984

U.S. Pat. No. 4,579,279—Electrostatic sprayers—Apr. 1, 1986

U.S. Pat. No. 6,354,522—Electrostatic sprayer—Mar. 12, 2002

U.S. Pat. No. 6,311,903—Hand-held electrostatic sprayer apparatus—Nov. 6, 2001

U.S. Pat. No. 4,579,279—Electrostatic sprayers—Apr. 1, 1986

U.S. Pat. No. 4,586,657—Malfunction detector for electrostatic spraying apparatus—May 6, 1986

U.S. Pat. No. 5,631,802—Control ring for input spray in electrostatic spray system—May 20, 1997

U.S. Pat. No. 7,360,724—Electrostatic spray nozzle with internal and external electrodes—Apr. 22, 2008

U.S. Pat. No. 6,138,922—Electrostatic spray module—Oct. 31, 2000

U.S. Pat. No. 6,682,004—Electrostatic spray device—Jan. 27, 2004

U.S. Pat. No. 7,150,412—Method and apparatus for electrostatic spray—Dec. 19, 2006

U.S. Pat. No. 4,398,672—Electrostatic spraying—Aug. 16, 1983

U.S. Pat. No. 5,314,123—Electrostatic spraying—May 24, 1994

U.S. Pat. No. 7,059,543—Liquid sprayers—Jun. 13, 2006

U.S. Pat. No. 5,172,861—Agricultural sprayer—Dec. 22, 1992

U.S. Pat. No. 4,613,075—Electrostatic spraying—Sep. 23, 1986

U.S. Pat. No. 4,664,315—Electrostatic spray nozzle—May 12, 1987

U.S. Pat. No. 5,485,956—Agricultural sprayer—Jan. 23, 1996

Likewise, in Chile there is only one patent related to the use of electrostatic applications in agriculture, but unlike our equipment, it is a device to specifically treat harvested fruit, this corresponds to the Request: 00055-2004, submitted on Jan. 15, 2004 and published in the Official Gazette on Dec. 24, 2004.

SUMMARY OF THE INVENTION

Unlike the technologies mentioned above, this innovation consists of a system to apply mainly phytosanitary products that use the principle of electrostatic attraction:—With a technology that permits a high static charge to be imprinted on the microdrops in the nozzle with high flows of water.—With a simple industrial design and very low probabilities of failure, it turns out to be very stable and reliable.—With the option to use an active water provider capillary tube in the nozzles (as opposed to a fixed one), which results in a more efficient use of the air to micronize drops.—With the option to use a chemical product doser system with injection in the nozzle itself.

High electrostatic charge: It is easier to imprint higher static charges if lower water flows are used. If the water flow is increased the charge "fades" or dilutes. The high charge obtained through this development taking into consideration the flows used evidences the high innovation level of this technology. With the combination of the bar design (or "Bank of Nozzles"), nozzles and electronics, the equipment operating at its maximum flow has the capacity to increase six times the charge delivered by existing technology, using flows that are five times higher pursuant to nozzle measurements or ten to fourteen times higher flows of water per equal bar length since this development uses a higher number of them. A higher electrostatic charge is obtained, using the same charge induction in the dispenser nozzles, which does not expose the drop to an electric charge higher than the one used by pre-existing low flow devices.

The force of attraction of the electrostatically charged drop to the target will directly depend on the machine's ability to transfer the static charge to it. The higher the charge the higher the attraction, therefore, a higher and better enveloping effect will be obtained and the product will cover 100% of the targeted surface. Being able to increase six times the charging ability of pre-existing technologies implies a significant increase in the efficiency of application due to electrostatic attraction. This together with higher flows, result in an application with unseen characteristics in the industry. Even if the equipment is used at high speed during application a higher electrostatic charge on the drop permits a strong attraction force that will equally ensure good coverage and deposit of products (meaning the amount of product left on the plant), therefore, the use of the device will be very efficient in terms of use of the machinery itself (more surface in less time).

High flow of water: The capacity of existing technologies in the market is not enough to ensure a good application. With low flows one application is not enough to adequately get the plant wet, and dries extremely quickly. This represents no problem for products that are intended to remain on the surface of fruits or foliage but it is a problem in cases where it is necessary a higher absorption by the plant or fruit.

The system subject matter hereof has the capacity to apply adjustable flows which would reach a maximum flow per nozzle five times higher than pre-existing electrostatic devices, not only without dropping the charge level, but keeping it six times higher than preexisting devices. This, together with the design of our bars and nozzles which is simple and therefore, of low manufacturing costs, allows the production to use more nozzles on the bar without having uncompetitive manufacturing costs. A higher number of nozzles and a higher flow per nozzle are the two components that permit us to have a high flow bar, since it is not just a nozzle that increases five times the flow of pre-existing devices, but also the fact that we can use a larger amount of them without having uncompetitive production costs.

Reliability: This innovation represents an advance in electrostatic technology due to its integral design with special emphasis on sophisticate electronics and the plain design of bars and nozzles which results in low probability of failure. There is a strong contribution from the point of view of reliability granted by this technology, since in the pre-existing technology the useful life of low flow bars and nozzles is really limited, approximately 800 hours pursuant to the specifications of certain manufacturers. This results from their fragile design, which turns them sensitive to burn by corona effect, that is why they become a high risk equipment because any short circuit burns them immediately, and at the time the nozzle with low water flows stops charging, the application turns out to be highly risky, therefore, it may create economic impairments of higher value than the equipment itself, since it cannot be ensured that the application produces the desired deposit with the product. This problem is solved by our innovation with its electronic technology. We can create extended short circuit conditions, and after we do the nozzle will resume its normal operation.

Air use efficiency: The devices used in the system subject matter hereof offer the option to use nozzles with fixed or active water provider capillary tube. The use of an active water provider capillary tube is translated into a more perfect micronization of the water drops with less air consumption to obtain it. This means that the source necessary to deliver the air may be smaller in capacity, fact which is very important from the point of view of saving the power required for the tractor or pulling vehicle used to move it. It must be mentioned that with this system we achieved at least 20% of saving regarding this resource as compared to what can be found in the market that uses the electrostatic principle with nozzle charge. This is very important from the commercial point of view, because many producers will not need to make investments in more powerful and expensive pulling machines different from the ones they already have, in order to commence using these high flow electrostatic devices.

Nozzle dosage: The system gives the possibility to dose chemical products to be applied directly on the nozzles. This means that products do not need to be mixed in the main water tank, which is an advantage from the point of view of a decrease in the handling of products by operators. On the other hand, the dosage system is controlled by a microprocessor. The microprocessor also permits maintaining exact records of the events related to the application and the use of each product, being an application control tool very valuable for producers. In addition, it means that changes of products used in the device can be easily made without it being necessary to throw away the product remaining in the main tank, and without it being necessary to wash the tank, and finally if no mixtures are made in the tanks there is no need to install stir pumps that are extremely expensive.

The result of this development implies a revolution in the chemical application systems, because it permits the application of products in a highly efficient manner and permits the access to working areas never accessed before with this kind of technology. The system subject matter of this innovation has the capacity to increase five times the application efficiency as compared to conventional hydraulic application systems, which results in a decrease in the use of chemical products and, therefore, causes less economic and environmental impact. In addition, it allows electrostatic technology to be part of extensive crop farming and fruit orchards where existing low flow electrostatic technologies cannot be part.

The pre-existing low flow application technology devices that use electrostatic charge can apply only 70 to 90 liters per hectare at a speed of 5 Km/H, keeping sufficient charge in the drop. The charge attraction implies that the low flow of water will mainly cover the first surface attracting it, reason why this low flow technology cannot be used in fruit orchards that have a dense canopy, unless applied to a flat type system, such as some high densities and vineyards that have thin foliage. Therefore, the existing technology is not used in fruit orchards with no structure whereat our development can be used with flows up to 14 times higher per hectare, measured under the same conditions and at the same speed than in the mentioned case.

At the same time, in the case of extensive crop farming in big land areas, costs need to be delimited and, therefore, high use efficiency is required in the machinery. Chemical applications are made at approximate speeds of 10 Km/H, which implies that low flow devices that apply 70 to 90 liters per hectare at 5 Km/H would instead apply 35 to 45 at double speed, which is not technically viable. In our case, if speed is doubled from 5 to 10 Km/H, we still wet 500 L/Ha, which is more than what is needed. This implies that this equipment may be used to make applications in areas not explored before by this technology.

In brief, the capacity of existing technologies in the market is not enough to ensure a good application. They deliver a low electrostatic charge; therefore, low flows must be used in each nozzle. With this flow one application is not enough to wet and dries extremely quickly. For the purposes of acceptably wetting the surface of the plants, it must be applied at slow speed. The foregoing causes the capacity of these machines to be absolutely insufficient to supply what is required by a great number of crops.

On the other hand, the useful life of these bars and low-flow nozzles is very limited, and its fragility makes them less reliable.

When implementing the technology subject matter of this invention request, the following is accomplished:—Increase in the electrostatic charge of the microdrops, and therefore, greater efficiency in the use of product is achieved.—Increase in the flow delivered by each nozzle, and the possibility of increasing the number of nozzles remaining within a competitive cost structure. These last items together makes it possible to have a high flow electrostatic system, which enables us to make applications in areas that have been little or not explored by this technology.—Increase the reliability of the system based on very stable electronics, controlled by microprocessors that do not allow the failure of the systems.—Increase the speed of the applications based on a greater flow and higher electrostatic charge on the drop, which provides for better efficiency in the use of the machinery. Given the faster speed of the greater flow, we do not sacrifice the quality of wetness required, since it continues being able to deliver it. And the better charge means that although the application is faster, the static attraction is so strong that it ensures a very good coating and deposit of the products.—The possibility to make a more efficient use of the air that is necessary to micronize the drops when using active water provider capillary tubes in the nozzles, which enables two very important points: that are the requirement of a smaller power blower, and therefore, a smaller power tractor or pulling vehicle to make it work.—The possibility of dosing the chemical products directly in the nozzle, which enables the reduction of operator contact with said products. It also enables to keep an accurate control thereof through the digital recording of all the events by the controlling microprocessor. It enables to change products used without it being necessary to empty the water from the main tank, and lastly, since no mixtures need to be made in the tank, there is no need to install stir pumps and their systems that are highly expensive.

The system subject matter of this request is made up by the elements that are described in the following figures.

BRIEF DESCRIPTION OF THE DRAWINGS

FIG. 1*b*: General view of The Bar.

FIG. 1*c*: Sketch of the contents of a Bar, without dosage of Chemical Products.

FIG. 2*a*: Double cap for Bar interconnection.

FIG. 4*c*: Holder of fix nozzle without injection of chemical products.

FIG. 6*h*: Part to fasten the dirigible nozzle.

FIG. 6*i*: View of the dirigible nozzle system assembled.

DETAILED DESCRIPTION

The electrostatic bar (or "Bank of Nozzles") (FIG. 1), has the function to hold the nozzles which are the ones driving the spray of water or product solution that is the purpose of the development of this innovation. The provision of air, water and high voltage to each nozzle and in some cases of chemical products must be carried out in this bar. The air breaks or micronizes the water drop and acts as driver of such micronized drop towards the application target. The water goes together with the chemical products to be sprayed, but if the dosage option with nozzle injection is used, the provision of water and of chemical products is performed separately.

Figure 1A:
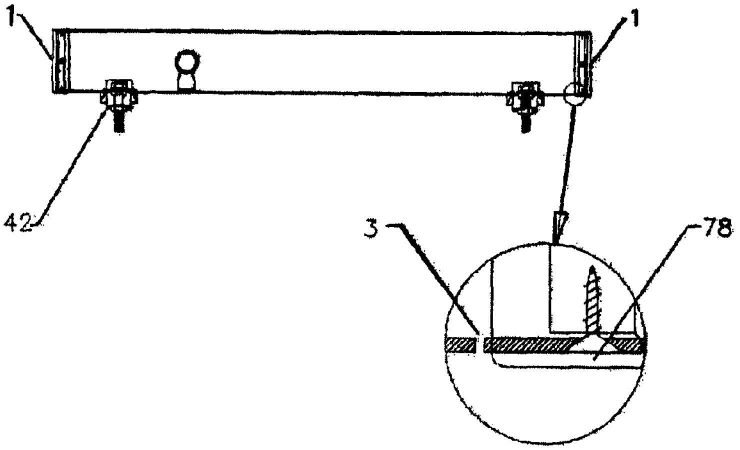
FIG. 1*a*: Bar sealed tube.
Figure 1E:
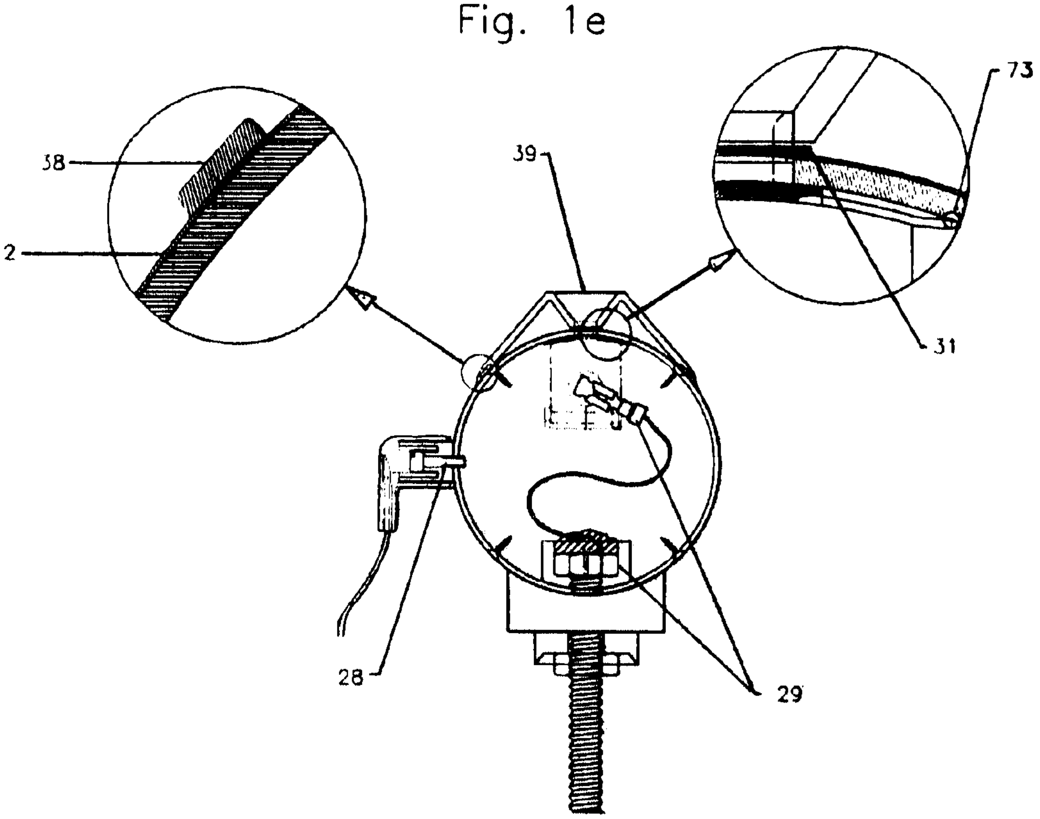
FIG. 1*e*: Cross section view of a Bar, with its high tension electrical terminals.
Figure 2:
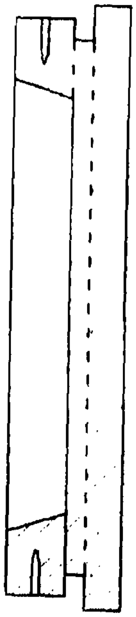
FIG. 2: Cap of the Bar tube.
Figure 2:
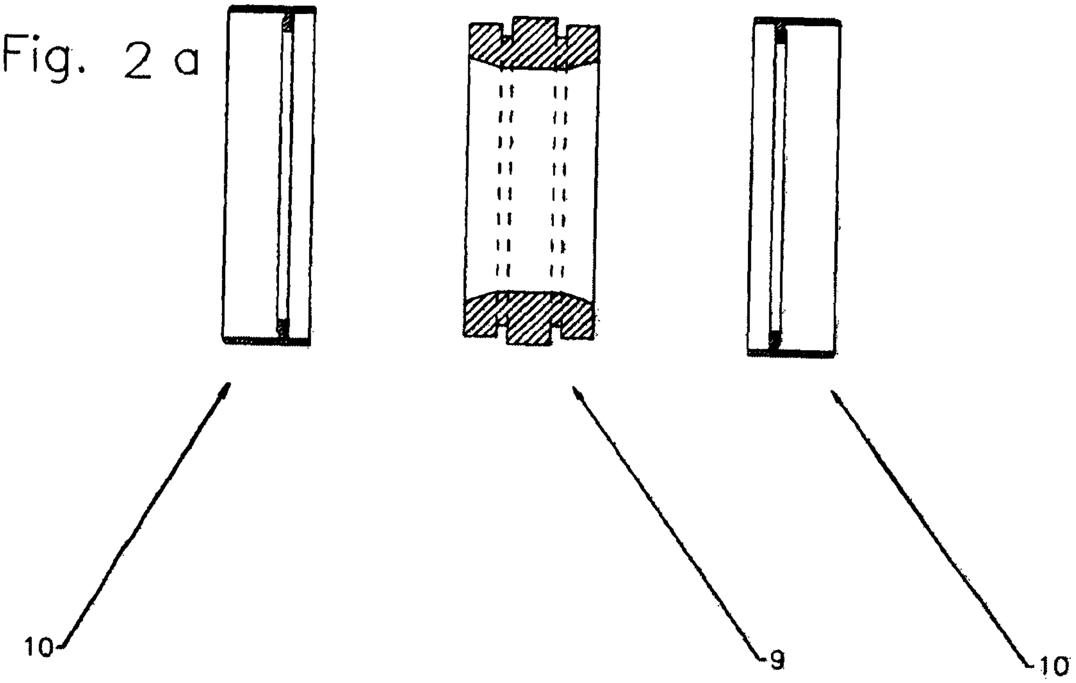

1.—The bar is constructed from a sealed tube (FIG. 1*a*), hermetically closed on both ends, allowing the bar itself to perform different functions such as: to protect its contents, make the electrical connection to the nozzles and act as air collector for them, being this bar the sole bar with electrostatic technology that does not need a special air collector, because the bar itself performs this function. We define the term "air collector" as a receptacle that is used to hold the air stream and then to distribute it to the nozzles. The tube is hermetically closed through two caps preferably made of rigid plastic with clamping screws (FIG. 1*a*, #1 and FIG. 2), but also may be tightened through another fastening system such as a bayonet, thread or any type of adhesive. Each cap has a seal on its joint with the tube, which has the function to cover in this case the head of the screws that fix the cap and insulate the high voltage, as well as to seal the join (FIG. 1*a*, #78; FIG. 2*a*, #10 and FIG. 2*b*, #11). The purpose is to create a big air collector, insulate and seal its contents as well as to keep inside the compressed air pressure with which the system works. This tube is preferably of cylinder shape but can also have any other shape. The measure more used is 75 mm of diameter, however, this measure may vary. The tube used is preferably made of stainless steel and has an insulating coating for electricity protection preferably made of composite material such as fiberglass or carbon fiber (FIG. 1*e*, #2). The bar's metallic structure makes the high voltage positive electrical connection to the nozzles. However, this tube may be made of any other metal or even an electrical insulating rigid material such as PVC or any other plastic, using electrical connection not through the tube itself but through any additional electrical conductor, such as a belt, ribbon, cable, wire, conducting paint such as silver paint or any other material. The fact that the bar itself is the air collector is important because it implies that during the manufacturing process a precision adjustment is not required between the input terminal and its internal structures, that is to say, due to the fact that the tube itself collects the air, the nozzles and the input of air to the bar may be placed in any part of the tube.

2.—Each bar has in the bottom a small hole which is the system to evacuate internal leaks of water or chemical products to the exterior. System that works efficiently because it is driven by the internal air pressure of the bar (FIG. 1*a*, #3).

3.—The terminals for connecting electricity (FIG. 1, #4), air (FIG. 1, #5 and FIG. 1*f*, #30), water (FIG. 1, #6), and in certain cases chemical products to the bar (FIG. 1, #7), are located to its side. This allows that when two bars are joined in a lateral continuous way ("Series connection"), there is the same distance between the last nozzle of the first bar and the first nozzle of the second bar (FIG. 1, #8), than inside each bar, to ensure that the target gets completely wet in an even manner. Internal connections from bar terminals to water collectors (FIG. 1*d*, #25), and to collectors of chemical products (FIG. 1*d*, # 26), are made through hoses. The positive high voltage connection is directly made to the bar from which it is connected to the nozzles (Page 30, lines 28 and 29), (FIG. 1, #4; FIG. 1*d*, #27 and FIG. 1*e*, #28). In case the bar is not made of an electrical conductor material, the connection from the bar terminal to the nozzles must be made through an additional conductor (Page 30, lines 29 to 33). Connection to ground is made through the bolt of the support of the bar to the sprayer structure (FIG. 1*e*, #29), (Page 32, lines 42 to 46).

Figure 2B:
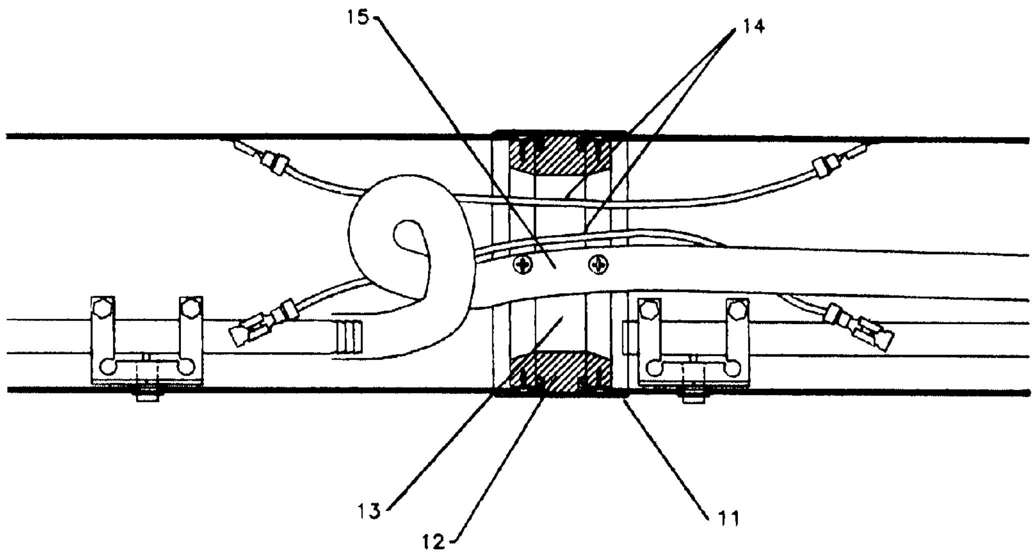
FIG. 2*b*: Double cap interconnection sketch.

4.—In certain cases the bars may be directly interconnected through the caps (FIG. 2*a*, #9 and FIG. 2*b*, #12). To such purpose, the cap is a double cap, that is to say, it is a single part that closes, seals, keeps joined and connects inside both bars. This inner connection is made through a simple drill (FIG. 2*b*, #13), that allows, in addition to make electrical connections (FIG. 2*b*, #14), the interconnection of water collectors (FIG. 2*b*, #15) as well as of chemical products if necessary.

5.—Each bar has inside a part denominated "water collector" (FIG. 1*c*, #16), which has more functions than only to collect and distribute water. We define the term "water collector" as a receptacle that is used to hold this liquid and then to distribute it to the nozzles. In addition to this activity, this part has an important function that is to be the positive charge reverse connection from the inside of the nozzles (FIG. 1*c*, #17), this innovation is a key factor to reach its charge performance. This collector houses the individual water provider capillary tubes that correspond to each of the nozzles of such bar (FIG. 1*c*, #18), fact which turns the collector itself into an integral part of each nozzle, this cannot be found in similar pre-existing devices using electrostatic technology. We define the term "water provider capillary tube" as a small tube that carries the water from the collector to each of the nozzles, being also the positive charge reverse connection from the nozzles. The collector is a tube preferably with the shape of a cylinder, preferably made of stainless steel with a diameter of 10 mm, however, it may be of any other shape, may have any other measure and may be made of any other electrical conductor material such as aluminum, copper, bronze or any other. It may also be made of a non-electrical conductor material and the connection can be made through any additional electrical conductor, such as a belt, ribbon, cable, wire, conducting paint such as silver paint or any other. The water provider capillary tube is also a tube preferably with the shape of a cylinder, made of stainless steel with a diameter of 2 mm, however, it may be of any other shape, may have any other measure and may be made of any other electrical conductor material such as aluminum, copper, bronze or any other. It may also be made of non-electrical conductor material such as resistant plastic, ceramic or any other, and the connection can be made through any additional electrical conductor, such as a belt, ribbon, cable, wire, conducting paint such as silver paint or any other, from the inside of the nozzle to the electrical conductor of the water collector.

6.—When the bars are for nozzles with injection or dosage of chemical products (FIG. 1*d*), each bar has inside a collector of chemical products next to the water collector and placed in parallel, to deliver the chemical products to the nozzles (FIG. 1*d*, #19). We define the term "chemical product collector" as a receptacle that is used to hold these products and then to distribute them to the nozzles. This collector is mounted on each nozzle's holder (FIG. 1*d*, #20), in the same way that the water collector does. It is a tube preferably with the shape of a cylinder, made of stainless steel with a diameter of 6.3 mm, however, it may be of any other shape, may be made of any other material and may have any other measure. This collector houses the needles that supply chemical products individually to each of the nozzles (FIG. 1*d*, #21). These needles go from the chemical products collector (FIG. 1*d*, #22), through the water collector (FIG. 1*d*, #23), to the inside part of the individual water provider capillary tube of the nozzles (FIG. 1*d*, #24), where the mix with water takes place. These needles and the chemical product collector also become an integral part of each nozzle. The needles are preferably of the shape of a cylinder, made of stainless steel with a diameter of 0.8 mm. However, they may be of any other measure, of any other material and of any other shape provided, that can deliver chemical products as mentioned above to the nozzles. Each product collector has an entry for chemical products (FIG. 1, #7), that comes from a previous chamber where products are mixed, located outside the bar.

7.—The water collector with individual water provider capillary tubes to each nozzle, is electrically insulated from the external tube of the bar by means of the holder of each nozzle. This turns the nozzle itself into a high voltage insulator of the electrical system (FIG. 1*d*, #20). In case the holder is made of an electrical conductor material, an additional insulator will be needed between the body of the nozzle and the water collector of the bar (Page 34, 12 to 14).

8.—The nozzles themselves are the mechanical fastening system of the water collector to the bar. The body of the nozzles (FIG. 1*c*, #33 and FIG. 1*d*, #34), are fixed to the bar through a clasp on each of them (FIG. 1*e*, #31 and FIG. 1*c*, #32). In turn, the body of the nozzles are fixed to the holder (FIG. 1*c*, #34 and FIG. 1*d*, #20), which fastens the water collector (Page 34, lines 21 to 23), (FIG. 1*c*, #35 and FIG. 1*f*, #36). As already described, the nozzles are the mechanical fastening system of the chemical product collector (Page 34, lines 23 to 26), (FIG. 1*d*, #37). This design is extremely simple, it permits the significant decrease of the number of parts used by pre-existing devices to attain its purpose. The simplicity of the design makes easier its manufacture, saves costs and decreases the possibility of failures.

9.—The negative pole of electrical connections are located in the water collector (Page 31, lines 5 to 7), and the positive pole, in the sealed tube of the bar (Page 30, lines 28, 29 and Page 31, lines 1 to 5). The water collector acts as electrical connection to ground for the nozzles since it is connected to the negative voltage electrical potential difference which, in turn, is connected to the general ground connections of the pulling vehicle (Tractor) and/or the device itself Besides, the device is directly connected to physical ground through drag metallic chains. The bar tube, in this case made of stainless steel, acts as high voltage connection of positive voltage electrical potential difference to the body of the nozzles. Electrical connections between interconnected bars or in "series connections" (Page 31, lines 9 to 14) are made through cables with terminals between both collectors and between the bar tubes (FIG. 2*b*, #14).

10.—On the external structure of the bar, on the insulating coating of the composite material, in this case of fiberglass or carbon fiber (FIG. 1*e*, #2), there are, on the side of each nozzle laterally placed, small tips or projections that fit the caps of each nozzle (FIG. 1*e*, #38). These firmly fix the position of such caps (FIG. 1*e*, #39).

Figure 1:
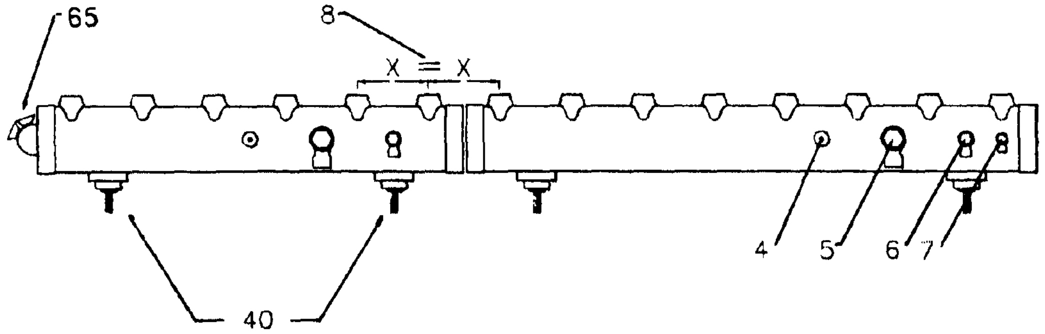
FIG. 1: Bar or “Bank of Nozzles”.
Figure 1D:
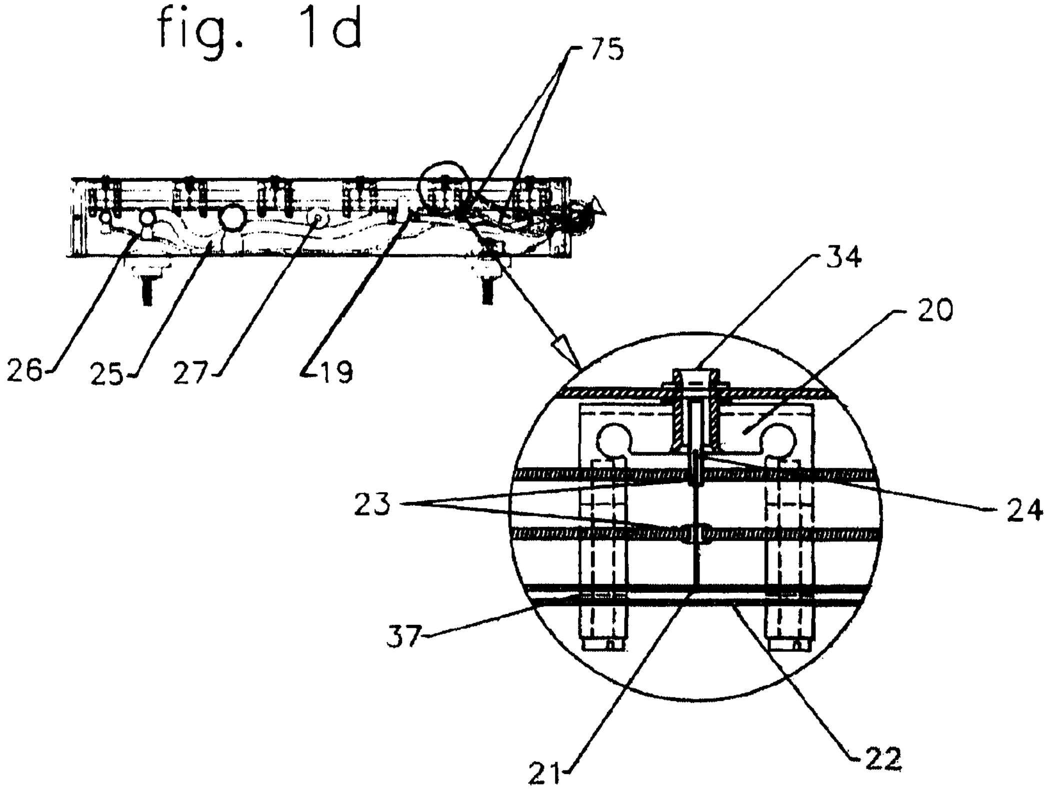
FIG. 1*d*: Sketch of the contents of a Bar, with dosage of Chemical Products.
Figure 1F:
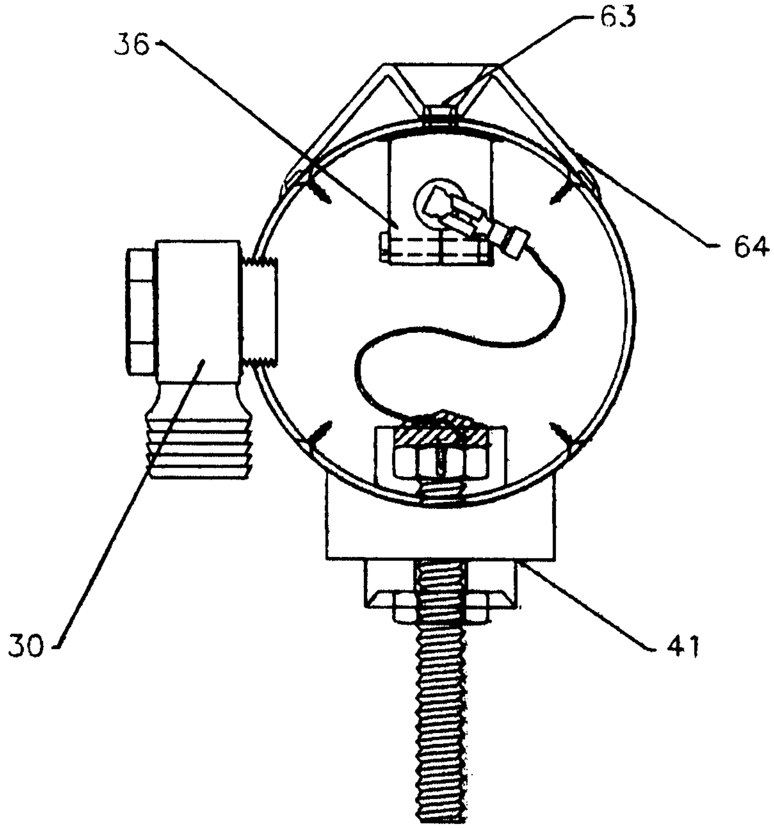
FIG. 1*f*: Cross section view of a Bar, with its air inlet terminal.
Figure 3:
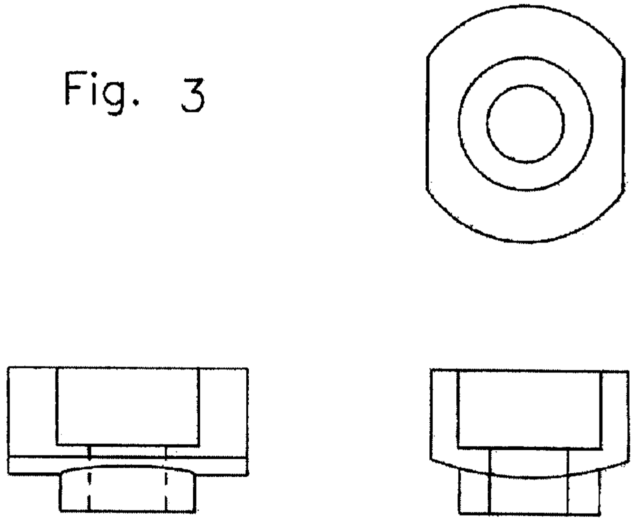
FIG. 3: Bar support (internal part), different views.
Figure 3A:
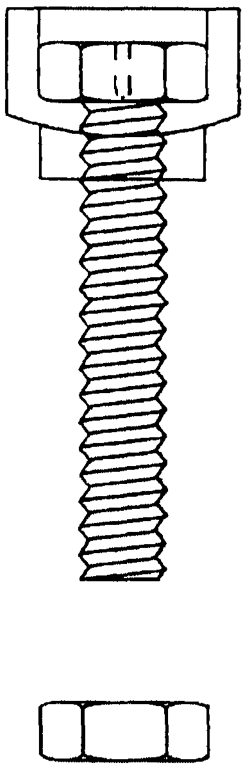
FIG. 3*a*: Internal part of the bar support including the bolt.
Figure 3B:
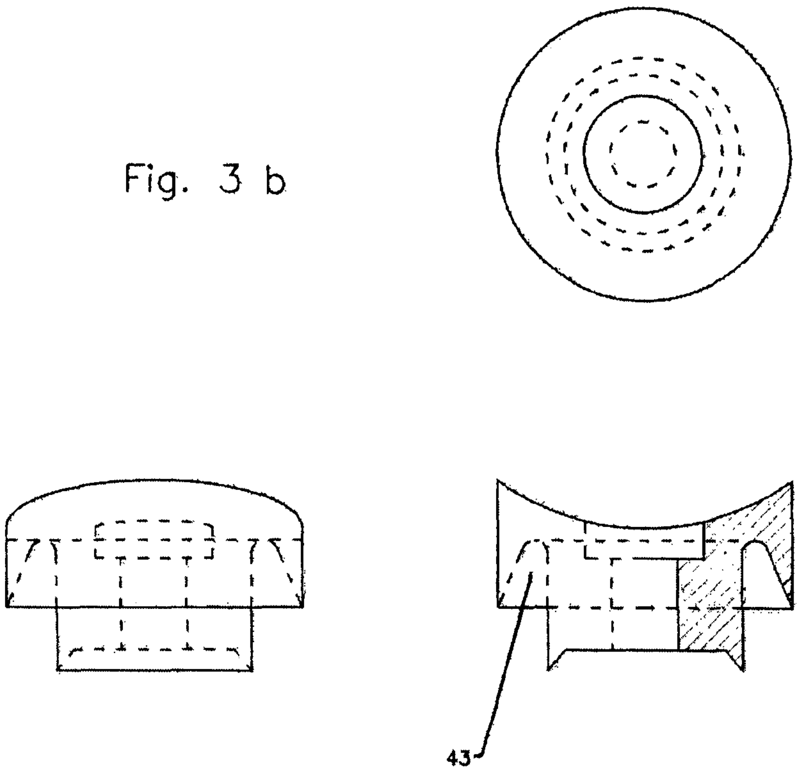
FIG. 3*b*: Bar support (external part), different views.
Figure 3C:
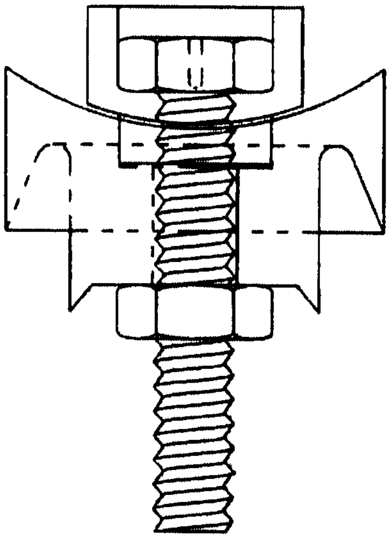
FIG. 3*c*: Bar support.

11.—The bar supporting system to the structure of the electrostatic spraying machine is made through fastening parts called "Supports" (FIG. 1, #40; FIG. 1*a*, #42 and FIG. 1*f*, #41). These supports are not only the fastening system but also act as electrical insulator of the bar tube that has the positive connection, from the structure of the sprayer. And also connects the negative to ground through such structure. They are made with parts of insulating material resistant to temperature and corrosion. One part is located outside the bar (FIG. 3*b*), and has a cavity or dry labyrinth that acts as electrical insulator in case there is a leak of water or liquid from the nozzles (FIG. 3*b*, # 43), stopping the passage of liquid and preventing electrical connection or high voltage leakage through it. The other part is located inside the bar (FIG. 3), and envelops part of a central bolt which is the mechanic fastening system (FIG. 3*a*.). This bolt is the electrical conductor of the negative connection from the high voltage system to the structure of the sprayer connected to ground. It tightens the internal part of the bar's support with the bar tube and with the external part of the support (FIG. 1*f*, #41). These bolts are used to fix the bar to the sprayer structure.

The integral design of the bar is so optimized that the total integration of its parts has been attained contributing to a simple and efficient design. The bar tube also acts as structure, air collector and if manufactured with material such as stainless steel is the high voltage electrical conductor of the nozzles. The nozzles in addition to their function as nozzles, act as electrical insulator of the water collector, and mechanically speaking they are the fastening system for the mentioned collector to the bar itself, and if applicable, for the chemical product collector also. On the other hand, the water collector itself is the water collector, the fastening system of the water provider capillary tubes and the positive charge reverse connection from each of the nozzles upon grounding them.

Nozzles

The nozzle is a key part of the system, where the drops to be sprayed are micronized and such microdrops receive the electrostatic charge. The air, water or liquid solution and in certain cases chemical products enter separately into the nozzle. Inside it, the air crashes into the liquid flow at great speed micronizing drops to sizes ranging from 30 to 60 microns. This micronization is extremely important because the resulting size of the microdrops directly affects the quality of the charge and furthermore, such microdrops cover surfaces better than bigger drops. Thanks to this and to the efficient electronic system a higher charge is attained, six times higher that pre-existing electrostatic devices that use from ten to fourteen times less water flow. All this without using higher impulse power than the power used by them (high tension voltage). For these reasons the quality of applications is extremely higher. When the nozzle includes the dosage of chemical products in it, products come from the chemical product collector and mix with water inside it. According to this we notice that inside the nozzle important processes are effected which are attained with a very simple design. This evidences the great innovative character of our development. It is a very simple nozzle composed of a reduced number of parts and easy mechanics, all of which results in low manufacturing costs. Simplicity is such that devices with similar technology using 14 parts in a nozzle still have lower benefits if compared with our development that only use 3 parts. This is a very important technical and commercial advantage because it permits the increase in the number of nozzles installed in the devices without increasing the costs of equipment and turning maintenance and replacement costs lower.

With the options of fix or active water provider capillary tubes the nozzle may be adapted to different air consumption to micronize the drop, allowing the manufacturing of devices with higher capacity and requiring lower power to operate. This is an achievement that pre-existing devices had not even considered.

The design of the nozzles makes them very resistant to the effect of electrical arches resulting from impurities in the product flow, and as they are not burnt, their useful life increases; therefore, they turn out to be very reliable.

These nozzles have capacity to deliver a flow up to five times higher and simultaneously increase up to six times the electrostatic charge of the microdrops as compared to pre-existing low flow electrostatic devices.

Figure 4:
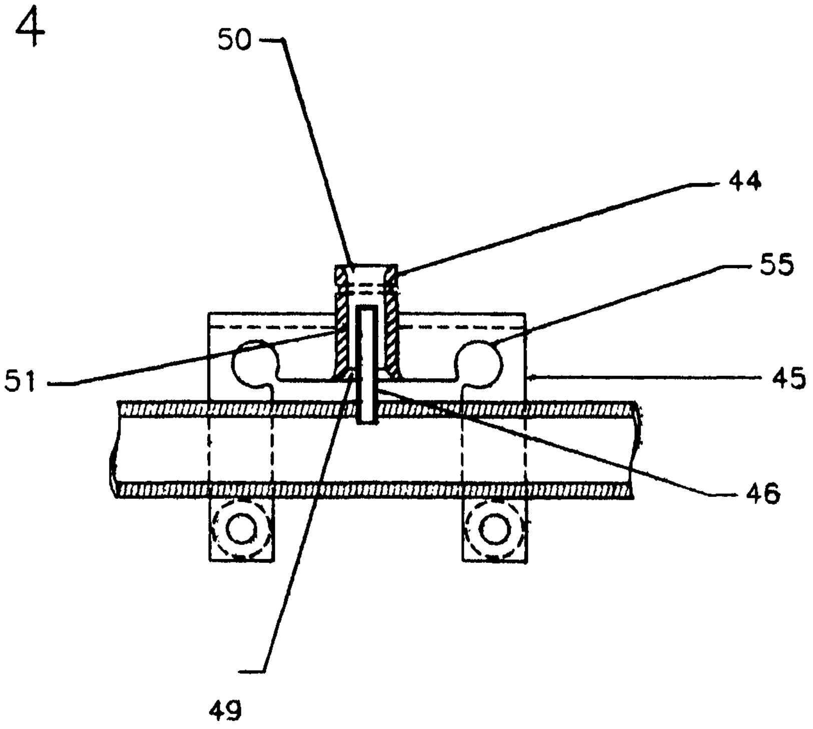
FIG. 4: Nozzle (Fixed nozzle with passive water provider capillary tube).
Figure 4A:
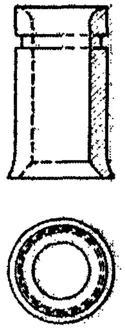
FIG. 4*a*: Nozzle body.
Figure 4B:
FIG. 4*b*: Nozzle water provider capillary tube.
Figure 4:
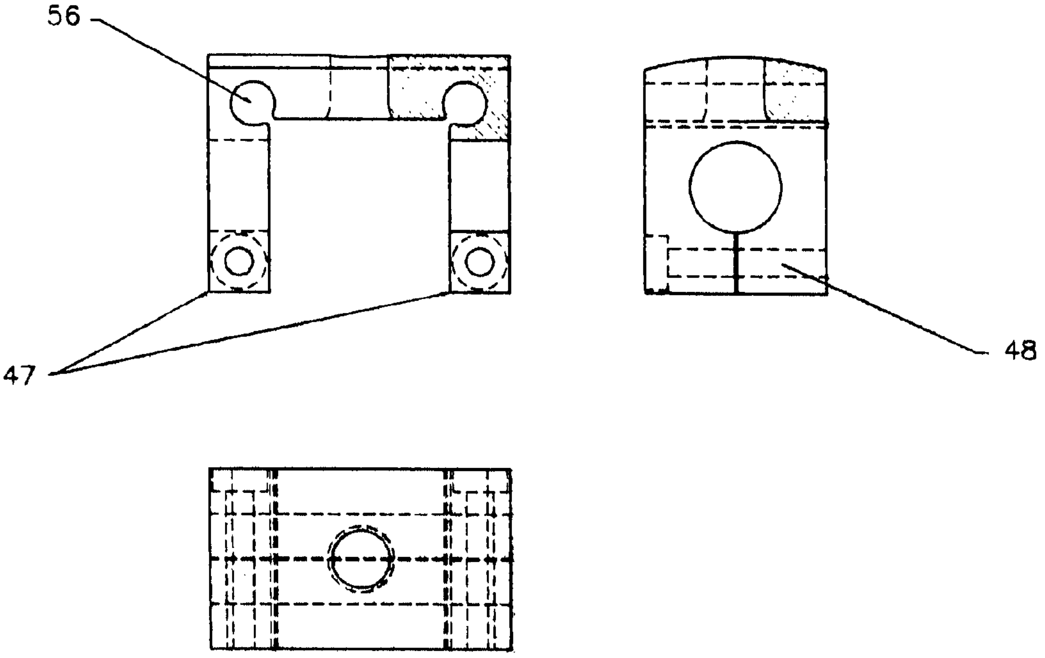
Figure 4D:
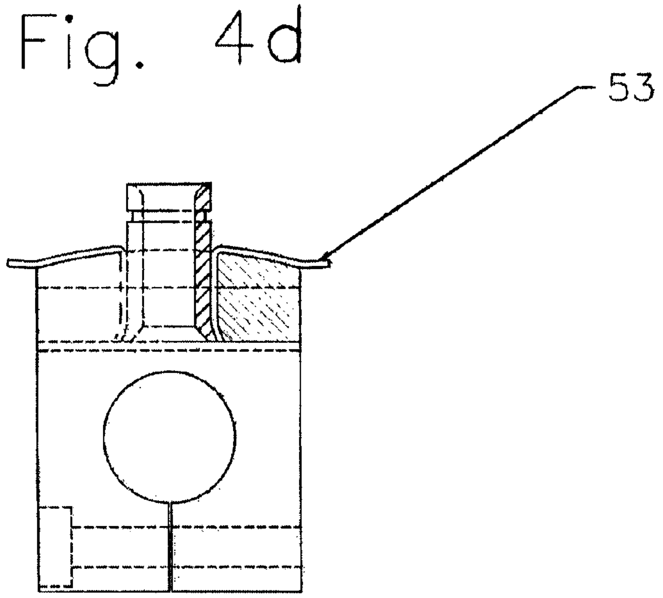
FIG. 4*d*: Holder of the nozzle with clamps for one collector (water).
Figure 4E:
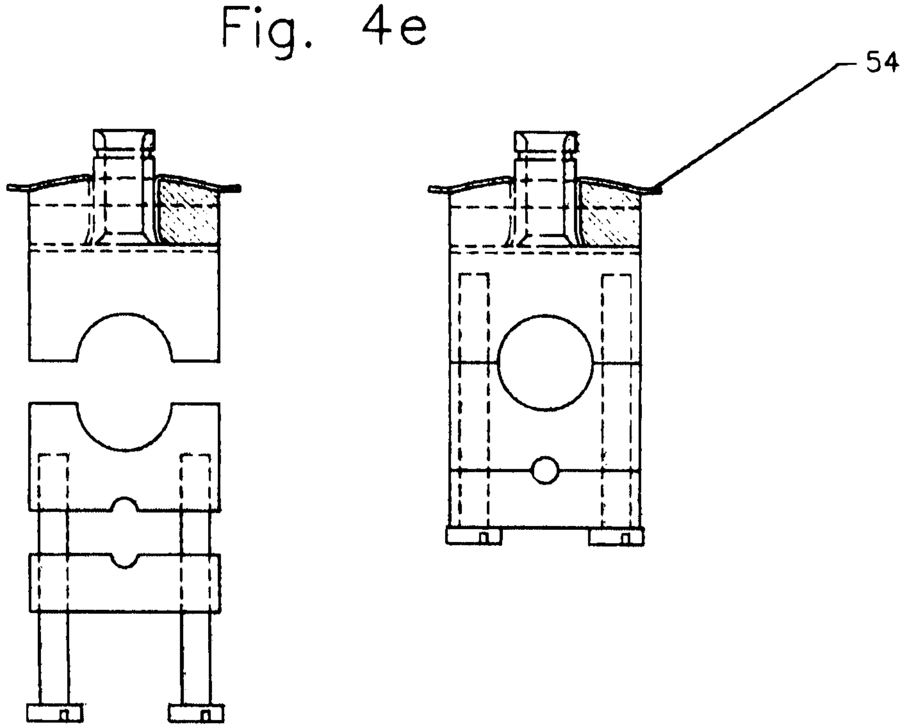
FIG. 4*e*: Holder of the nozzle with clamps for two collectors (water and chemical products).

1.—Parts of the nozzle (FIG. 4): Each nozzle is composed of a body (FIG. 4, #44 and FIG. 4*a*), a holder (FIG. 4, #45 and FIG. 4*c*), and a water provider capillary tube (FIG. 4, #46 and FIG. 4*b*).

a) The holder is made of electrical insulating material and keeps inside the body of the nozzle (FIG. 4). This is preferably made of plastic, with high thermal resistance and resistant to corrosion; however, it can be made of any other material. This electrical insulating material is used to hold the body of the nozzle and to keep it electrically insulated from the high voltage negative connection. However, this holder may also be made of any non insulating material and may use other insulating material to insulate them when fastening the nozzles to the water collector that carries the negative connection. Also the holder and the body of the nozzle may be made of only one part, of any conducting or non conducting material and the high voltage electrical connection may be made through any additional conductor provided it is insulated from the negative connection. The dimensions of this holder may vary provided it has the capacity to: hold the body of the nozzle and keep it balanced with respect to the shaft of the water provider capillary tube of each of them, and electrically insulate the body of the nozzle from the high voltage negative connection, which can also be effected through an additional insulator in case the holder is made of conducting material. The holder has two clamps for fastening the water collector (FIG. 4*c*, #47), each of them is fastened with a screw (FIG. 4*c*, #48 and FIG. 4*d*). The holder of nozzles with injection of chemical products has an additional two clamps (FIG. 4*e*), to hold both the chemical product collector and the water collector. In this case, clamps are fastened with two vertical screws (Perpendicular to the case of the screw for the body for the water collector alone), (FIG. 4*e*).

b) The body of the nozzle (FIG. 4*a*), includes: a fluid entry (FIG. 4, #49), a fluid exit (FIG. 4, #50), and an internal channel between such fluid entry and exit (FIG. 4, #51). In the centre, inside the body, is located the water provider capillary tube (FIG. 4, # 46). The centered position of it with respect to the body of the nozzle results from the holder. The body is composed preferably of a cylinder-shaped tube. The inside of the body is also preferably cylinder-shaped, however it may have another non cylinder geometrical shape. The tube of the body is made preferably of electrical conductor material, preferably of stainless steel. But it can also be made of non-conductor or semi-conductor electrical material in combination with electrical conductor material. Such as ceramic covered with silver paint. A diameter of 6.3 mm and a length of 12 mm are used, however, such measures may also vary.

c) The water provider capillary tube of the nozzle (FIG. 4, #46), is described as a component of the bar water collector because it is housed by it. However, even though it is not directly in contact with the body or the holder of the nozzle it is an integral part of it. This part not only carries water to the nozzle but also has the important function to be the positive charge reverse connection (Page 31, lines 24 to 26 and 31 to 38).

2.—The electrical connection between the body of the nozzle and the electrified sealed tube of the bar is directly made with a high precision machining (FIG. 1*c*, #52).

3.—The electrical connection between the body of the nozzle and the electrified tube of the bar is strengthen through two filaments preferably made of stainless steel integrated between the body of the nozzle and the holder (FIG. 1*e*, #73; FIG. 4*d*, #53 and FIG. 4*e*, #54), which filaments may be of any other electrical conductor material. The connection may also be strengthened with conducting paint.

4.—We use the two connection systems described in paragraphs 2 and 3 in order to ensure a good connection but we can use only one of them indistinctly.

5.—The holder has two holes in the internal corners that have the function to increase the distance of existing isolating surface between the water collector and the body of the nozzle turning more difficult that a corona effect may take place in the internal path (FIG. 4, #55 and FIG. 4*c*, #56).

6.—The bottom end of the body of the nozzle in the internal channel is centered without touching the water provider capillary tube, generating a window or space for the air-streams to escape (FIG. 4, #49), with which the drop micronization is effected inside the body of the nozzle.

Figure 4F:
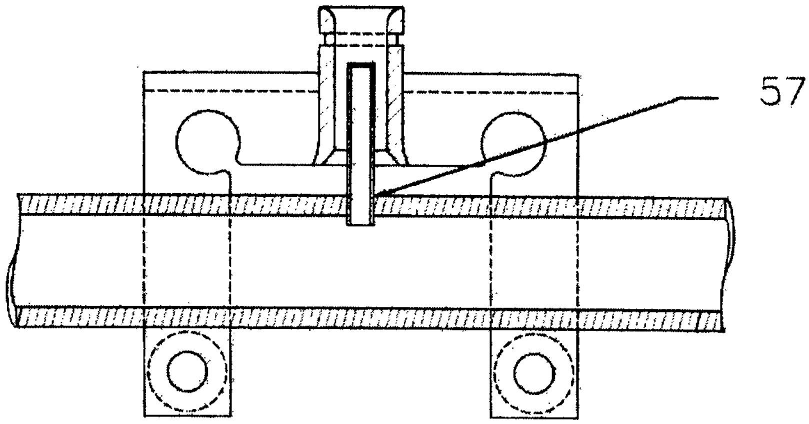
FIG. 4*f*: Nozzle with passive or fixed water provider capillary tube.
Figure 4G:
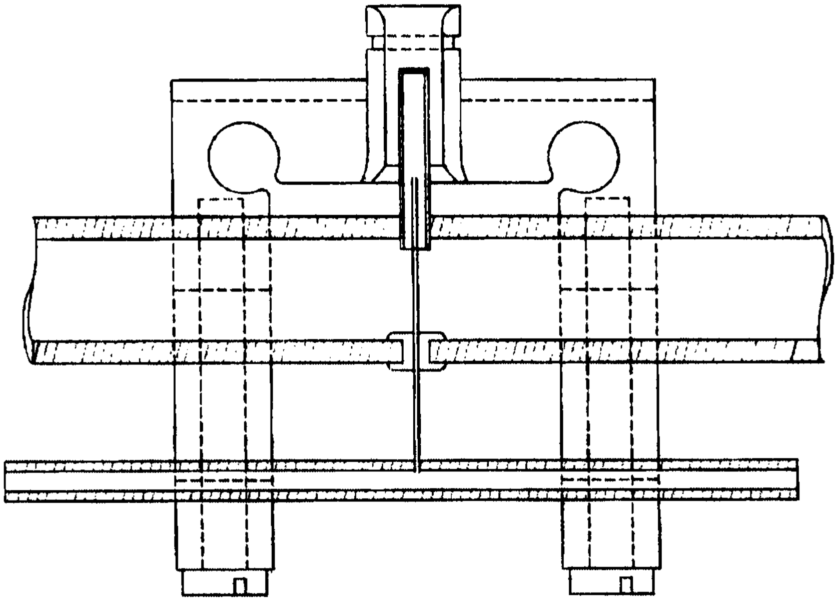
FIG. 4*g*: Nozzle with passive water provider capillary tube and injection of chemical products.
Figure 4H:
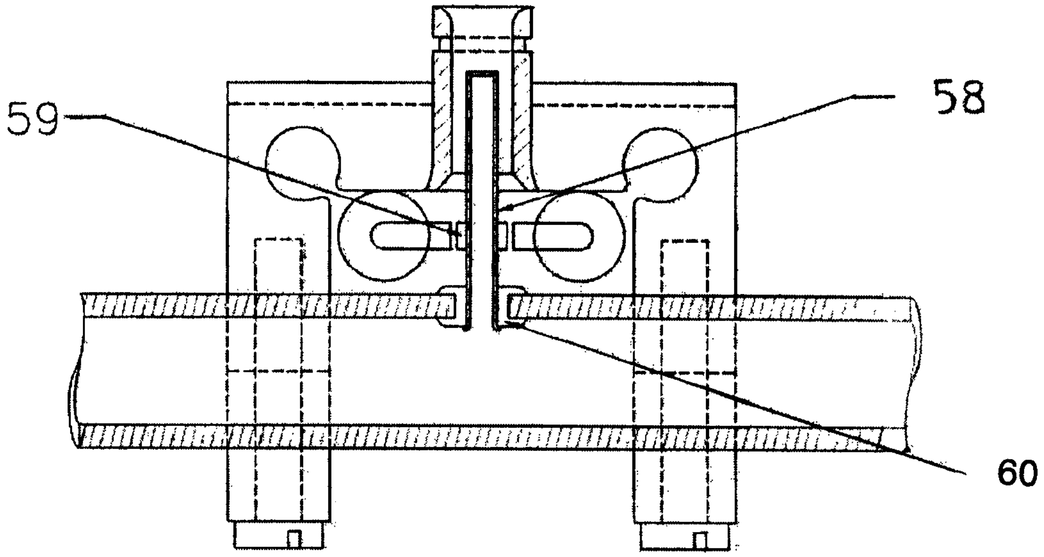
FIG. 4*h*: Active nozzle.
Figure 4I:
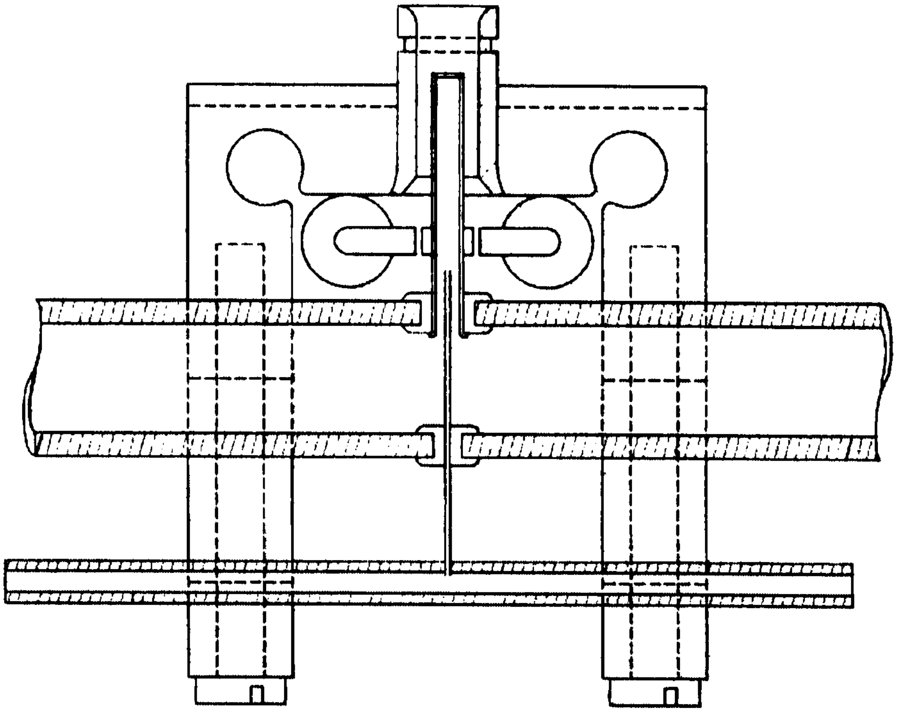
FIG. 4*i*: Active nozzle with injection of products.
Figure 4J:
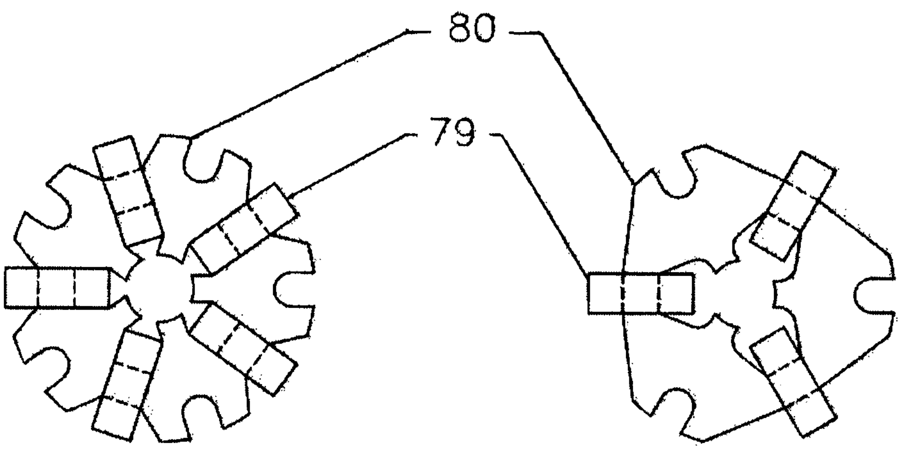
FIG. 4*j*: Nozzle electromagnetic coils, examples with 5 and 3 coils.
Figure 4K:
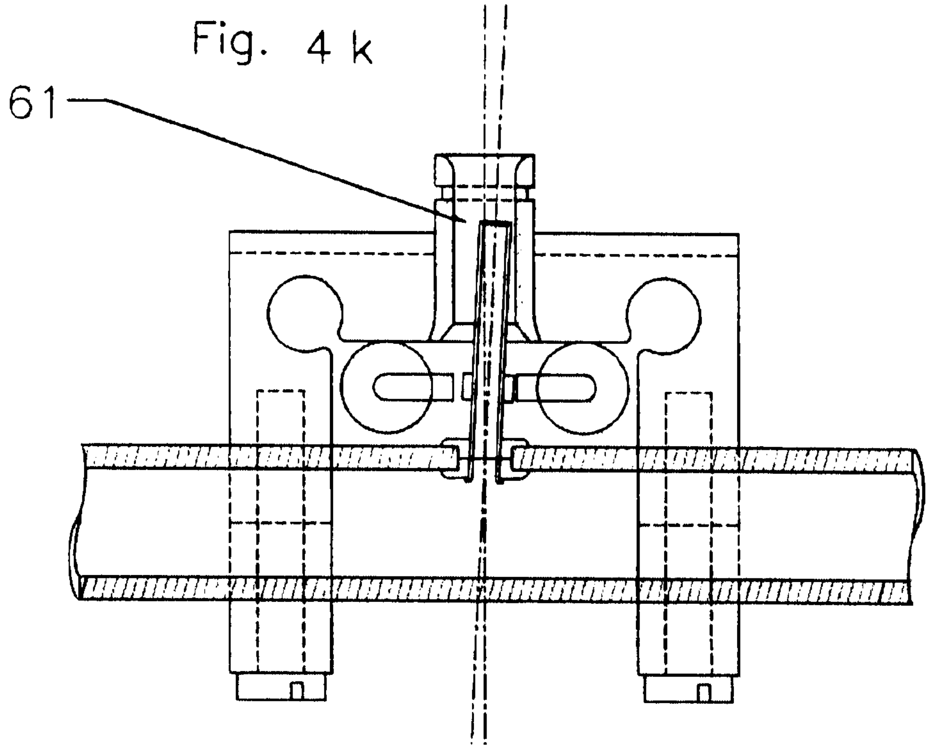
FIG. 4*k*: Active nozzle showing the inclination of the shaft of the water provider capillary tube.

7.—The water provider capillary tubes may be static (FIG. 4*f*, #57): rigidly attached to the water collector bar, or active (FIG. 4*h*, #58): attached to the water collector in a flexible manner, with a rotating or lifting configuration, with 2, 3, 4, 5 or N number of movements that may be in the shape of a triangle, a star or in any other shape. In this last case, the end of the water provider capillary tube of the nozzle that connects to the water collector of the bar, has attached a magnetic toroidal ring (FIG. 4*h*, #59), or the water provider capillary tube itself may be magnetic. In this way, it may be attracted by 2, 3, 4, 5 or N number of electromagnetic coils, placed outside the water duct (FIG. 4*j* shows the coils (#79), mounted on the shield (#80)), generating the described movements. When the electromagnetic coils are powered, they attract the toroidal ring or the magnetized water provider capillary tube's body, changing the inclination of its shaft (FIG. 4*k*), which rotates or lifts in a seal of elastic material (FIG. 4*h*, #60). The order, frequency, speed and time to power the coils will determine the active movements of the nozzle water provider capillary tubes. Its change of position leaves big spaces in the window created inside the body of the nozzle (FIG. 4*k*, #61), between such body and it. The water has more exposure to the air-streams of the nozzle that in the case of fix water provider capillary tubes, generating bigger turbulences that ensure with their crashes and opposed currents, a more efficient micronization of drops and less air consumption to such effect.

8.—The internal channel of the body of the nozzle acts as an electrode, with a positive charge of a predetermined voltage that due to the repulsion of charges generates an opposed electrostatic charge to the fluid that passes through such internal channel. In the way to the outside, inside the electrified stainless steel body, there occurs a tangent charge in the microdrop, deviating positive charges to the tank and loading them with a negative charge.

9.—The top end of the nozzle to the exterior of the system is the head of the nozzle or leakage vortex or outlet orifice of the nozzle (FIG. 1*c*, #33).

Figure 5:
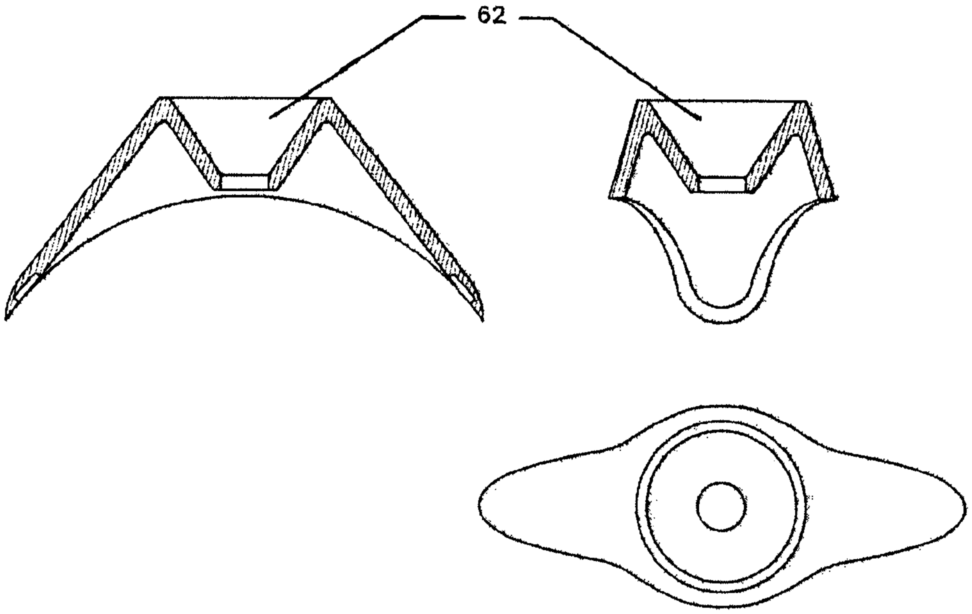
FIG. 5: Nozzle Cap.

10.—On the head of the nozzle and fastened to the bar there is a cover called "Nozzle cap" (FIG. 5), which has protection purposes. The described part may be independent or be a part of the composite material of fiberglass or carbon that insulates the bar (Page 30, lines 26 to 28). The upper part of the nozzle cap has a hole in the middle with the shape of tapered or countersunk trunk (FIG. 5, #62), through the center of which appears the leakage vortex of the nozzle (FIG. 1*f*, #63), from where the spray liquid subject matter of this development comes out. This cap forms an acute angle to its side in order to reach the bar (FIG. 1*f*, #64). This acute angle is important because it mechanically protects the nozzle from objects that may hit it such as branches. Therefore such objects slip and deviate without causing damage to the nozzle instead of hitting it.

Figure 6:
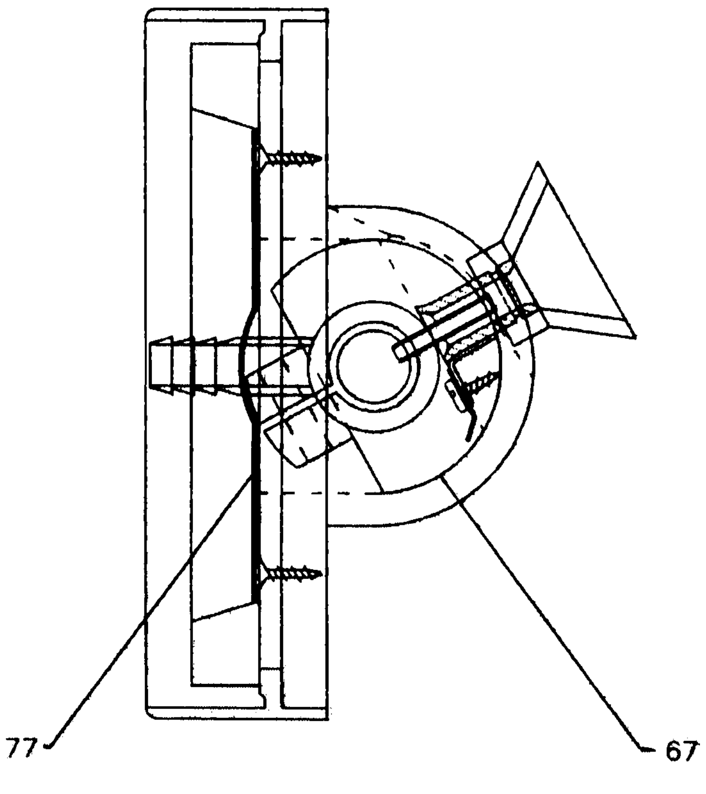
FIG. 6: Bar cap with dirigible nozzle.
Figure 6A:
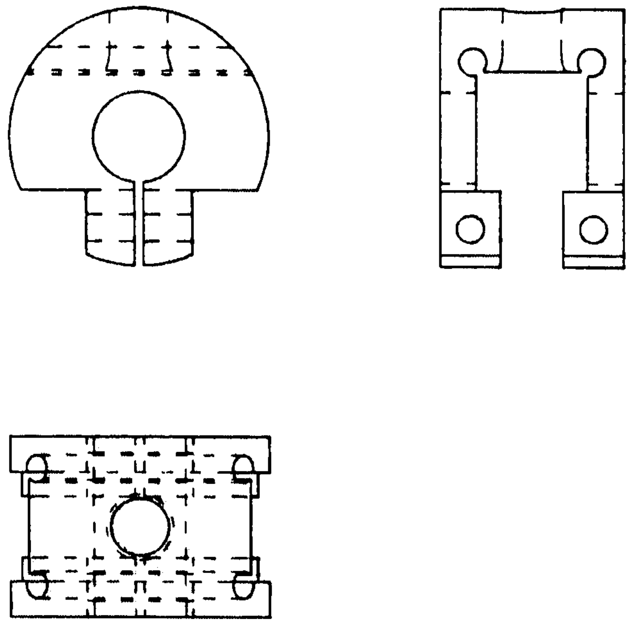
FIG. 6*a*: Holder of the dirigible nozzle.
Figure 6B:
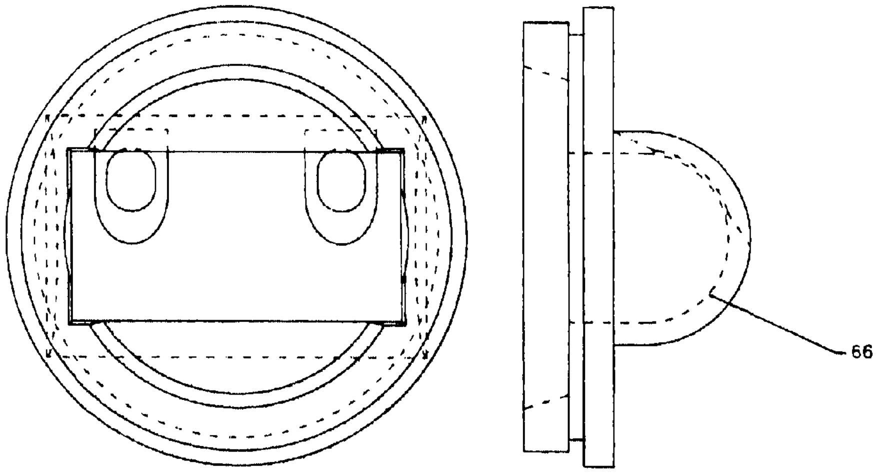
FIG. 6*b*: Bar cap for dirigible nozzle (detail of the cylinder shaped cavity).
Figure 6C:
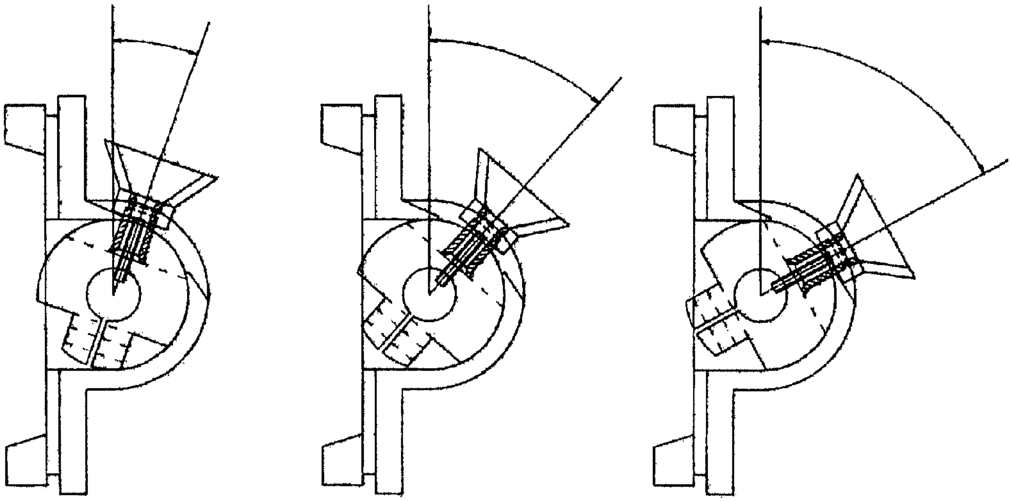
FIG. 6*c*: Shift angle of the dirigible nozzle.
Figure 6D:
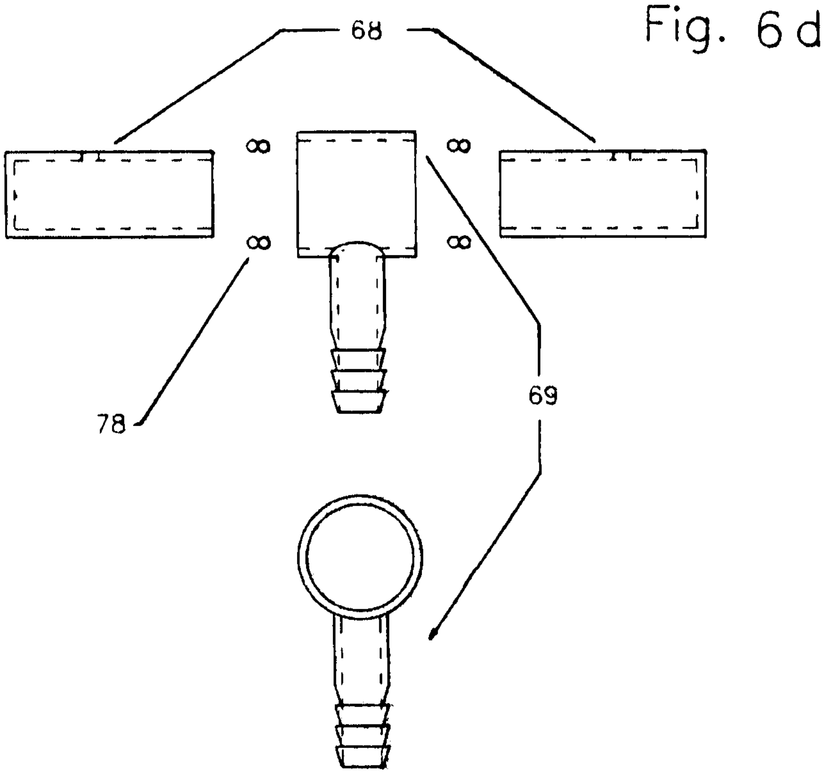
FIG. 6*d*: Water collector of the dirigible nozzle.
Figure 6E:
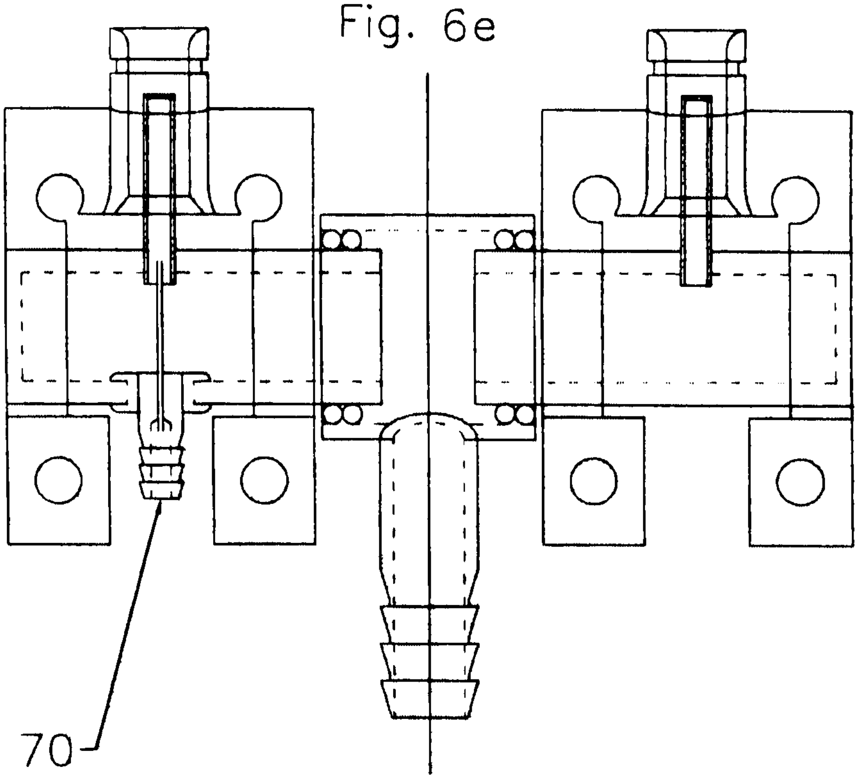
FIG. 6*e*: Comparison of dirigible nozzles with and without chemical product injection.
Figure 6F:
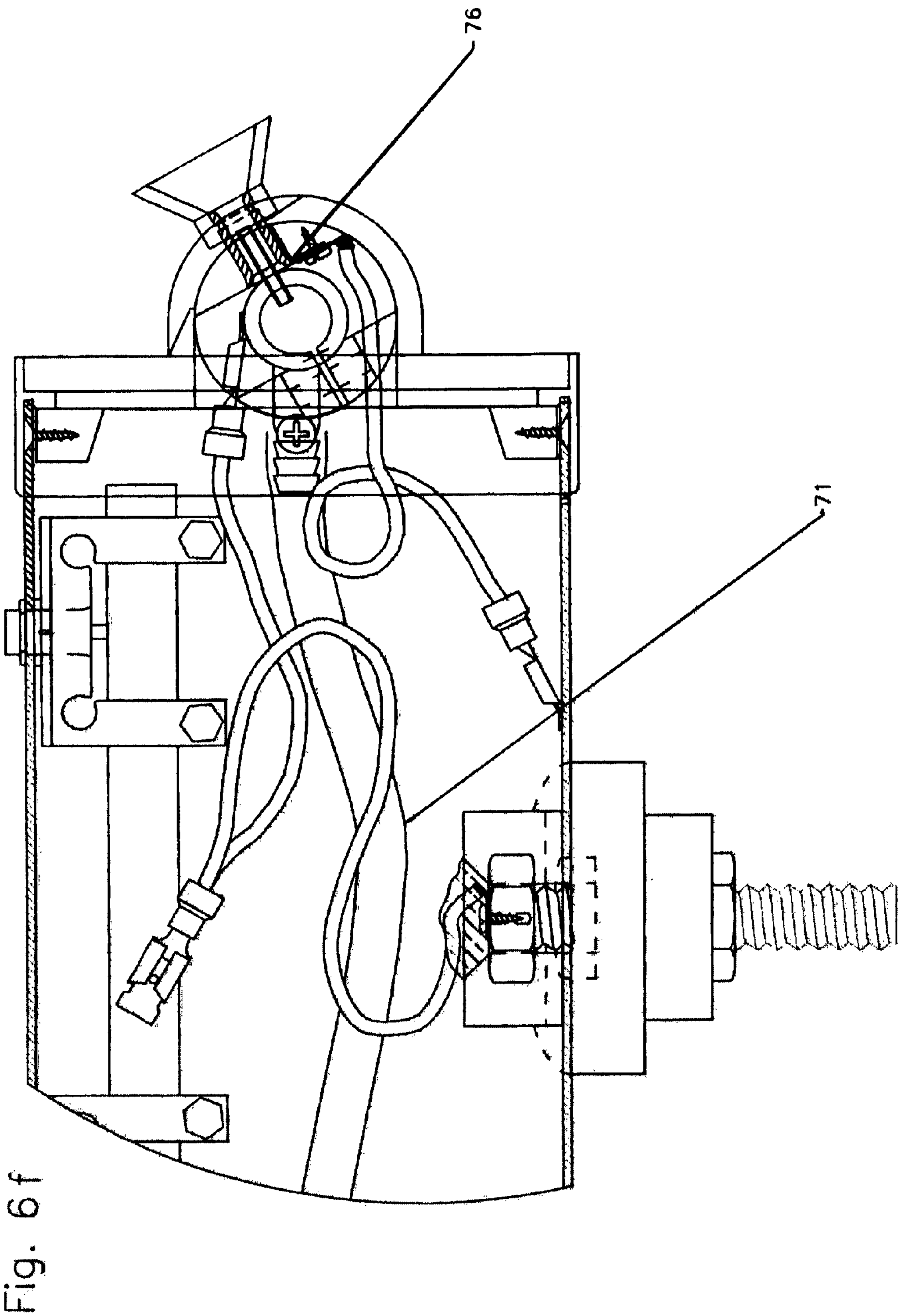
FIG. 6*f*: Dirigible nozzle and its connections.
Figure 6G:
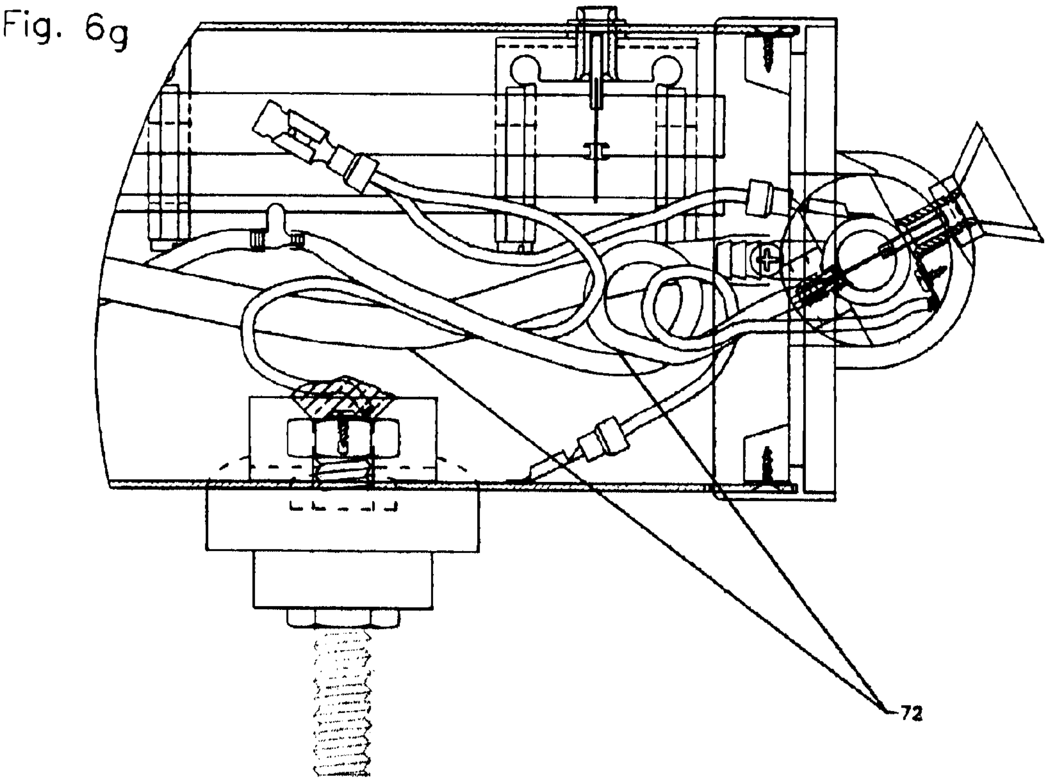
FIG. 6*g*: Dirigible nozzle with chemical product injection and its connections.
Figure 6:
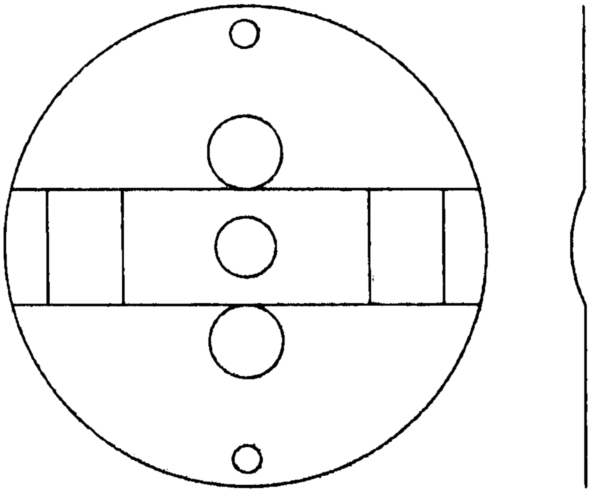
Figure 6:
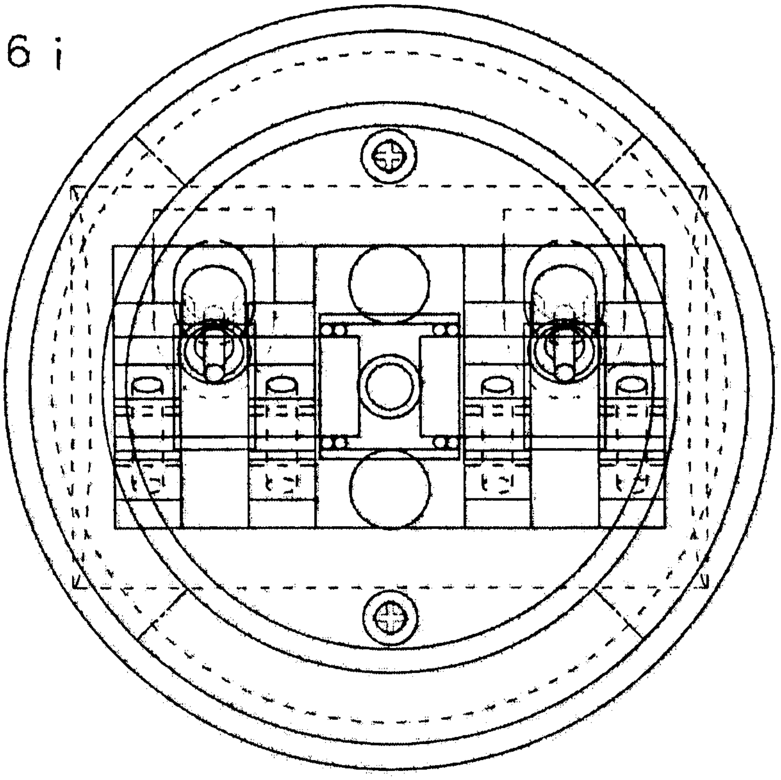

11.—In certain cases the nozzles are dirigible (FIG. 1, #65). These nozzles are installed on the caps of the bars (FIG. 6). The difference with the fixed nozzle is that the holder of the nozzle has a cylinder shaped body (FIG. 6*a*), placed to the inside of another with the cylinder cavity (FIG. 6*b*, #66), to permit the desired rotation (FIG. 6*c*). The dirigible nozzle is composed of one part of isolating material with concave shape (FIG. 6*b*, #66), that inside houses the cylinder-shaped holder or holders of such nozzles (FIG. 6*a*.) The ensambling or assembly of the concave shape of the part and the convex shape of the nozzle allows rotation (FIG. 6*c* and FIG. 6, #67). The water collector of the dirigible nozzles is short and acts as shaft over which such nozzles move (FIG. 6*d*). The collector as shaft (FIG. 6*d*, #68), rotates on a fixed part that collects water for the dirigible nozzles (FIG. 6*d*, #69). The rotary movement is sealed by two "O" rings, (FIG. 6*d*, #78). In the case of a dirigible nozzle with injection of chemical products, the collector of the chemical products is hosted in the water collector (FIG. 6*e*, #70). Water collectors and collectors of chemical products of dirigible nozzles are connected to the main water and chemical products collectors of the bars through hoses (FIG. 1*c*, #74; FIG. 1*d*, #75; FIG. 6*f*, #71 and FIG. 6*g*, #72). The high voltage connection of dirigible nozzles is made through an electrical conductor from the main bar to a terminal that connects integrated filaments between the body of the nozzle and the holder (FIG. 6*f*, #76), (Page 35, lines 4 to 8). The complete system of the dirigible nozzle is placed in position in the cylinder shaped cavity of the cap (Lines 13 to 16 of this page), through a part that presses the cylinder shaped body of the nozzles with the concave shape of the system that represents such cavity (FIG. 6*g*, 6*h* and FIG. 6, #77).

Bar Configuration Options

Figure 7:
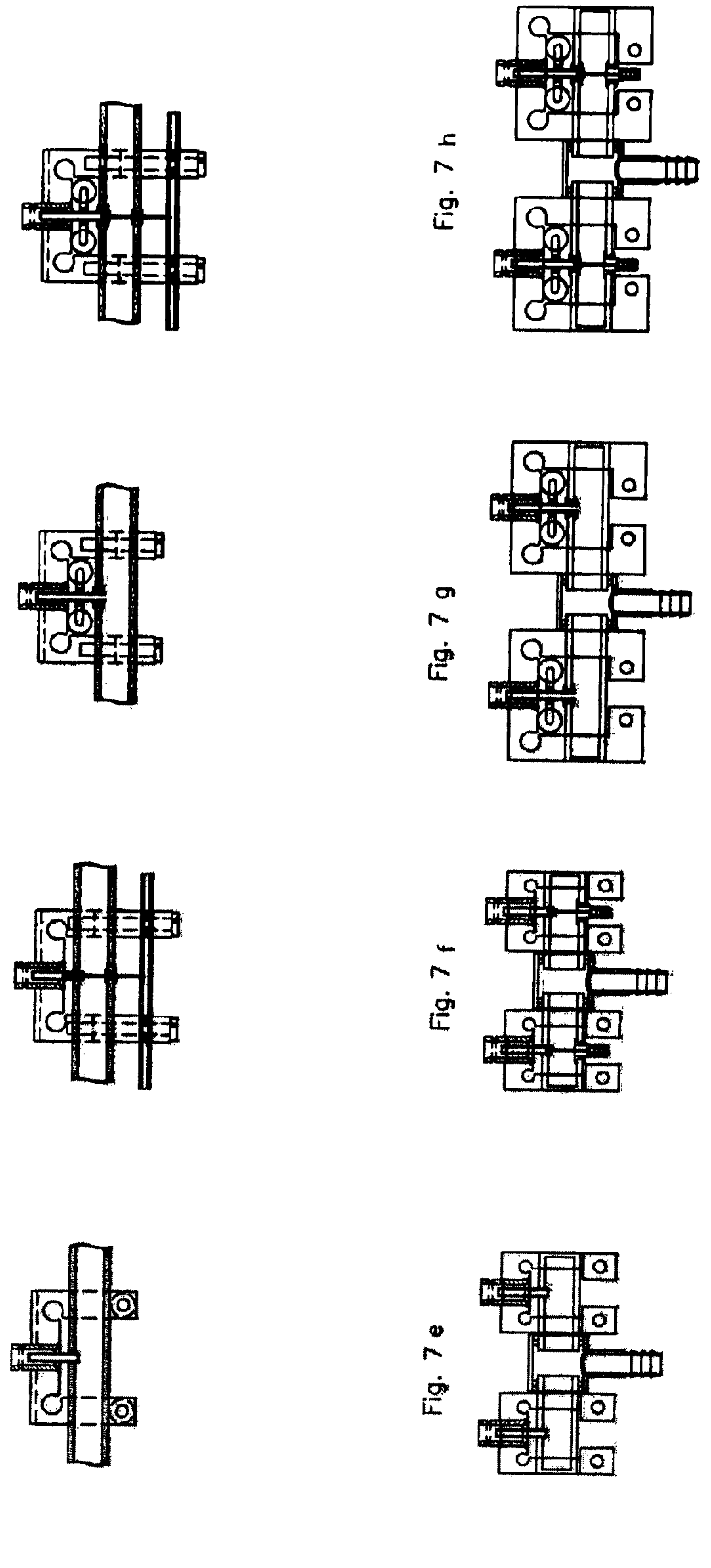
FIG. 7 (including FIGS. 7*a*-7*h*): Nozzle configurations.

Pursuant to what has been mentioned above, it is possible to manufacture eight different bar configurations according to the type of nozzles (FIG. 7), which are the following:

1).—Fixed nozzles with passive water provider capillary tubes (FIG. 7*a*.).

2).—Fixed nozzles with passive water provider capillary tubes and with chemical product injection (FIG. 7*b*).

3).—Fixed nozzles with active water provider capillary tubes (FIG. 7*c*).

4).—Fixed nozzles with active water provider capillary tubes and with chemical product injection (FIG. 7*d*).

5).—Dirigible nozzles with passive water provider capillary tubes (FIG. 7*e*).

6).—Dirigible nozzles with passive water provider capillary tubes and with chemical product injection (FIG. 7*f*).

7).—Dirigible nozzles with active water provider capillary tubes (FIG. 7*g*.).

8).—Dirigible nozzles with active water provider capillary tubes and with chemical product injection (FIG. 7*h*).

Electronics

The main purpose of the electronics for the system is to negatively charge the microdrops. The electronics drives to the nozzle a high level of power voltage and when water flows the microdrops are tangentially charged.

The electronic design of the system consists of a circuit designed around two microprocessors. Microprocessors can continuously control the flow of water through each nozzle set, and instantaneously adapt the voltage, correcting and compensating variations that take place, either due to operator's instructions or due to variations in different system components. Such adjustments are continuously made with the equipment operating in a normal range of operation. If for any reason the equipment fails to operate within this range, the electronic system informs such situation to the operator.

This electronic design causes that the equipment using the same voltage or slightly superior voltage (between 10% and 25% more), than the voltage used by pre-existing low flow electrostatic devices, is able to spray from ten to fourteen times more water and charging six times more than such devices. Using digital technology and based on a microprocessor, the electronics is capable of charging the drop in a way that was unknown in the market until now. Thanks to an integral design not only of the electronics and of the microprocessor programs, but also of the bar and the nozzles.

In addition to its significance in terms of wetness and coverage quality, commercially speaking means the exploration of unexplored areas for this type of devices, where efficiency of use of the machinery is needed and only can be attained with these high flow electrostatic devices.

The invention claimed is:

1. A high flow electrostatic sprayer comprising:

a bar comprising a tube defining a hollow internal space that is sealed at opposite first and second ends, said tube adapted to receive pressurized air from an associated source into said internal space;

a plurality of nozzle bodies connected to said tube, each of said nozzle bodies electrically connected to said bar for receiving a high voltage positive electrical charge from said bar, wherein each of said nozzle bodies comprises an inlet in communication with the internal space and an outlet located external to said internal space and an internal channel that connects said inlet to said outlet such that pressurized air within said internal space of said tube can flow outwardly through each of said nozzle bodies;

a water conduit located within the internal space of the tube and adapted to be connected to an associated source of water, said water conduit supported within said internal space of said tube by a plurality of internal supports, wherein the water conduit comprises an electrical ground path;

a plurality of capillary tubes each in fluid communication with said water conduit and each also electrically connected to said ground path of said water conduit, wherein said plurality of capillary tubes are located respectively within the internal channels of the plurality of nozzle bodies such that liquid ejected by said capillary tubes within the respective internal channels will be micronized into droplets by pressurized air flowing from the inlet of the nozzle to the outlet of the nozzle and said micronized droplets will be ejected from said outlet of said nozzle;

a bar support that is connected to the bar but electrically isolated from the bar, said bar support adapted for connection to an associated sprayer machine structure, wherein said bar support is electrically connected to said ground path of said water conduit to form part of said ground path, wherein pressurized air from the internal space of the tube is discharged to the exterior of the tube through the nozzle bodies that are connected to the high voltage positive electrical charge and said pressurized air flowing through each of said nozzle bodies micronizes liquid flowing from the respective capillary tube located in said internal channel of said nozzle body to form negatively charged micronized liquid droplets that are discharged from said outlet of the nozzle body with said pressurized air.

2. A high flow electrostatic sprayer comprising:

a bar comprising a tube defining a hollow internal space that is sealed at opposite first and second ends, said tube adapted to receive pressurized air from an associated source into said internal space;

a plurality of nozzles each comprising a nozzle body mechanically and electrically connected to said bar for receiving an electrical charge from said bar, wherein each nozzle body comprises an inlet in communication with the internal space and an outlet located external to said internal space and an internal channel that connects said inlet to said outlet such that pressurized air within said internal space can flow outwardly through each nozzle body;

a water conduit located within the internal space of the bar and adapted to be connected to an associated source of water, said water conduit connected to said bar by a plurality of internal supports, said water conduit comprising an electrical ground path;

a plurality of capillary tubes each in fluid communication with said water conduit and each also electrically connected to the electrical ground path of said water conduit, wherein said plurality of capillary tubes are located respectively within the internal channels of the plurality of nozzle bodies such that liquid ejected by said capillary tubes within the respective internal channels will be micronized into droplets by pressurized air flowing from the inlet of the nozzle body to the outlet of the nozzle body and said micronized droplets will be elected from said outlet of said nozzle;

a bar support that is connected to the bar but electrically isolated from the bar, said bar support adapted for connection to an associated sprayer machine structure, wherein said fastening support is electrically connected to said electrical ground path of said water conduit;

a dosing system has for injecting chemical products directly into each nozzle body, said dosing system comprising:

a chemical product conduit located within the internal space of the bar and adapted to be connected to an associated source of chemical product, said chemical product conduit connected to said bar by said one or more internal supports;

a plurality of hollow chemical supply needles respectively associated with said plurality of nozzles, wherein said plurality of needles are in fluid communication with said chemical product conduit at a first end and are in fluid communication with a respective one of said nozzle bodies at a second end such that associated chemical products are communicated from said chemical product conduit to said nozzle bodies.

3. The high flow electrostatic sprayer as set forth in claim 2, wherein each of said chemical supply needles is located at least partially within a respective one of said capillary tubes so as to be adapted to supply associated chemicals from said chemical product conduit into said respective capillary tube.

4. The high flow electrostatic sprayer as set forth in claim 3, wherein each of said chemical supply needles extends through said water conduit into a respective one of said capillary tubes.

5. The high flow electrostatic sprayer as set forth in claim 3, wherein each of said nozzle bodies is mechanically connected to one of said internal supports that connect said water conduit to said bar, and wherein each of said nozzle bodies is mechanically connected to the bar such that said mechanical connection of each nozzle body to the bar mechanically connects said respective internal supports to said bar.

6. The high flow electrostatic sprayer as set forth in claim 3, wherein said nozzle bodies are defined from stainless steel.

7. The high flow electrostatic sprayer as set forth in claim 5, wherein each of said internal supports comprises internal corners, and wherein holes are formed respectively in said internal corners of said support to increase an isolation surface distance between the water conduit and the respective nozzle connected to the internal support thereby minimizing a corona effect.

8. The high flow electrostatic sprayer as set forth in claim 5, further comprising at least one electrically conductive filament located between each nozzle body and the respective internal support to which it is connected, wherein said filament is electrically connected to said bar.

9. The high flow electrostatic sprayer as set forth in claim 1, wherein each of said capillary tubes is fluidically connected to said water conduit by an elastic seal such that said capillary tube is adapted to vary its position within said internal channel of its respective nozzle.

10. The high flow electrostatic sprayer as set forth in claim 9, wherein said nozzle body is part of a nozzle assembly that comprises means for altering said position of said capillary tube within said internal channel of its respective nozzle body.

11. The high flow electrostatic sprayer as set forth in claim 9, wherein said water capillary tube or a part connected thereto comprises a magnetic material, and wherein said nozzle body is part of a nozzle assembly that comprises electromagnetic coils that upon energizing attract said magnetic material to influence a position of said capillary tube within said internal channel of its respective nozzle body.

12. The high flow electrostatic sprayer as set forth in claim 5, further comprising a plurality of external nozzle caps connected to an outer surface of said tube respectively adjacent said plurality of nozzles, wherein each of said caps comprises an upper part including a hole aligned with said outlet of said nozzle, said upper part defining an acute angle as the upper part extends toward the bar such that said cap protects said nozzle and is adapted to deflect associated branches away from said nozzle.

13. A high flow electrostatic sprayer comprising:

a bar comprising a tube defining a hollow internal space that is sealed at opposite first and second ends, said tube adapted to receive pressurized air from an associated source into said internal space;

a plurality of nozzles each comprising a body mechanically and electrically connected to said bar for receiving an electrical charge from said bar, wherein each nozzle body comprises an inlet in communication with the internal space and an outlet located external to said internal space and an internal channel that connects said inlet to said outlet such that pressurized air within said internal space can flow outwardly through each nozzle body;

a water conduit located within the internal space of the bar and adapted to be connected to an associated source of water, said water conduit connected to said bar by a plurality of internal supports, said water conduit comprising an electrical ground path;

a plurality of capillary tubes each in fluid communication with said water conduit and each also electrically connected to the electrical ground path of said water conduit, wherein said plurality of capillary tubes are located respectively within the internal channels of the plurality of nozzle bodies such that liquid ejected by said capillary tubes within the respective internal channels will be micronized into droplets by pressurized air flowing from the inlet of the nozzle body to the outlet of the nozzle body and said micronized droplets will be ejected from said outlet of said nozzle;

a fastening support that is connected to the bar but electrically isolated from the bar, said fastening support adapted for connection to an associated sprayer machine structure, wherein said fastening support is electrically connected to said electrical ground path of said water conduit;

wherein at least one of said opposite first and second ends of said bar comprises an end bar cap connected thereto that seals an open end of said hollow internal space, said high flow electrostatic sprayer nozzle assembly further comprising a dirigible (steerable) nozzle assembly connected to said end bar cap and that is adjustable in position, said dirigible nozzle assembly further comprising a dirigible nozzle body electrically connected to said bar and water supply shaft about which said dirigible nozzle rotates electrically connected to said ground path.

14. A high flow electrostatic sprayer comprising:

a bar comprising a stainless steel tube defining a hollow internal space that is sealed at opposite first and second ends, said tube adapted to receive pressurized air from an associated source into said internal space;

a plurality of nozzles each comprising a body mechanically and electrically connected to said bar for receiving an electrical charge from said bar, wherein each nozzle body comprises an inlet in communication with the internal space and an outlet located external to said internal space and an internal channel that connects said inlet to said outlet such that pressurized air within said internal space can flow outwardly through each nozzle body;

a water conduit located within the internal space of the bar and adapted to be connected to an associated source of water, said water conduit connected to said bar by a plurality of internal supports, said water conduit comprising an electrical ground path;

a plurality of capillary tubes each in fluid communication with said water conduit and each also electrically connected to the electrical ground path of said water conduit, wherein said plurality of capillary tubes are located respectively within the internal channels of the plurality of nozzle bodies such that liquid ejected by said capillary tubes within the respective internal channels will be micronized into droplets by pressurized air flowing from the inlet of the nozzle body to the outlet of the nozzle body and said micronized droplets will be ejected from said outlet of said nozzle;

a fastening support that is connected to the bar but electrically isolated from the bar, said fastening support adapted for connection to an associated sprayer machine structure, wherein said fastening support is electrically connected to said electrical ground path of said water conduit.

15. The high flow electrostatic sprayer as set forth in claim 1, wherein said tube of said bar is electrically conductive and comprises an external cover of electrically insulative material.

16. The high flow electrostatic sprayer as set forth in claim 1, wherein said tube comprises at least one small hole defined therein for evacuation of leaked water from said hollow internal space by force of said pressurized air contained in said internal space.

17. The high flow electrostatic sprayer as set forth in claim 1, comprising at least two of said bars with their respective tubes connected in series with each other using a double end cap.

18. The high flow electrostatic sprayer as set forth in claim 1, wherein said bar support comprises a cavity or dry labyrinth that acts as an electrical insulator with respect to liquid contacting said bar and said bar support to prevent conduction of electricity from said bar to the associated spraying machine through said liquid in contact with said bar and said bar support.

* * * * *